(12) United States Patent
Suzuki et al.

(10) Patent No.: US 8,780,721 B2
(45) Date of Patent: Jul. 15, 2014

(54) NETWORK SYSTEM, CONTROLLER, METHOD, AND PROGRAM

(75) Inventors: Kazuya Suzuki, Tokyo (JP); Junichi Yamato, Tokyo (JP)

(73) Assignee: NEC Corporation, Tokyo (JP)

( * ) Notice: Subject to any disclaimer, the term of this patent is extended or adjusted under 35 U.S.C. 154(b) by 155 days.

(21) Appl. No.: 13/500,065

(22) PCT Filed: Oct. 5, 2010

(86) PCT No.: PCT/JP2010/067404
§ 371 (c)(1),
(2), (4) Date: Apr. 3, 2012

(87) PCT Pub. No.: WO2011/043312
PCT Pub. Date: Apr. 14, 2011

(65) Prior Publication Data
US 2012/0201140 A1 Aug. 9, 2012

(30) Foreign Application Priority Data

Oct. 6, 2009 (JP) ................................. 2009-232307

(51) Int. Cl.
*H04L 12/26* (2006.01)
(52) U.S. Cl.
USPC ....................................... 370/235; 370/395.5
(58) Field of Classification Search
USPC ............................................. 370/235, 395.5
See application file for complete search history.

(56) References Cited

U.S. PATENT DOCUMENTS

| 6,538,991 B1 * | 3/2003 | Kodialam et al. ............. 370/229 |
| 6,643,254 B1 * | 11/2003 | Kajitani et al. ............... 370/217 |
| 6,950,432 B2 * | 9/2005 | Chen et al. ..................... 370/390 |
| 7,130,262 B1 * | 10/2006 | Cortez et al. .................. 370/216 |
| 2008/0117892 A1 * | 5/2008 | Bahr et al. ...................... 370/351 |

FOREIGN PATENT DOCUMENTS

| JP | 5-3475 A | 1/1993 |
| JP | 7-250356 A | 9/1995 |
| JP | 2000-059374 A | 2/2000 |
| JP | 2000-069031 A | 3/2000 |
| JP | 2004-056340 A | 2/2004 |
| JP | 2009-206718 A | 9/2009 |

OTHER PUBLICATIONS

International Search Report in PCT/JP2010/067404 dated Dec. 28, 2010 (English Translation Thereof).
Nick McKeown et al., "OpenFlow: Enabling Innovation in Campus Networks", Mar. 14, 2008 <Internet URL: http://www.openflowswitch.org//documents/openflow-wp-latest.pdf>.
"OpenFlow Switch Specification" Version 0.9.0. (Wire Protocol 0x98) Jul. 20, 2009 <Internet URL: http://www.openflowswitch.org/documents/openflow-spec-v0.9.0.pdf>.

* cited by examiner

*Primary Examiner* — Hassan Kizou
*Assistant Examiner* — Abdullahi Ahmed
(74) *Attorney, Agent, or Firm* — McGinn IP Law Group, PLLC

(57) ABSTRACT

In shifting a flow that passes through a node onto a different alternative path which does not pass through the node passed through by the flow, a controller that controls a flow of each node under control determines alternative candidate paths, each of which has a same source and a same destination as a path associated with the flow to be shifted and does not pass through the node passed through by the flow to be shifted, determines the alternative path from the alternative candidate paths according to a predetermined criterion, and aggregates flows of each node on the alternative path.

19 Claims, 22 Drawing Sheets

ALTERNATIVE CANDIDATE PATH 1 : S ⇒ SW1 ⇒ SW5 ⇒ SW6 ⇒ D
ALTERNATIVE CANDIDATE PATH 2 : S ⇒ SW4 ⇒ SW5 ⇒ SW6 ⇒ D
ALTERNATIVE CANDIDATE PATH 32 : S ⇒ SW4 ⇒ SW5 ⇒ SW3 ⇒ D

NUMERICAL VALUE INDICATES CURRENT NUMBER OF FLOW ENTITIES
(INCLUDING NUMBER OF FLOW ENTITIES ASSOCIATED WITH OLD PATH OF FLOW F)

INFLUENCE RATE OF ALTERNATIVE CANDIDATE PATH 1: $E1 = MAX((8 - 1 + 1), (3 + 1), (4 + 1)) = 8$
INFLUENCE RATE OF ALTERNATIVE CANDIDATE PATH 2: $E2 = MAX((5 + 1), (3 + 1), (4 + 1)) = 6$
INFLUENCE RATE OF ALTERNATIVE CANDIDATE PATH 3: $E3 = MAX((5 + 1), (3 + 1), (7 - 1 + 1)) = 7$

ALTERNATIVE PATH 2 IS SELECTED

FIG. 17A  FLOW ENTITY TO BE REGISTERED FROM NOW ON

| NUMBER | RULE | | | ACTION |
| --- | --- | --- | --- | --- |
| | DESTINATION IP ADDRESS | SOURCE IP ADDRESS | SOURCE PORT | DESTINATION PORT | |
| Fe | A | C | X | Y | FORWARD TO SW5 |

FIG. 17B  FLOW ENTITY TABLE

| NUMBER | RULE | | | | ACTION | NUMBER OF MATCHES |
| --- | --- | --- | --- | --- | --- | --- |
| | DESTINATION IP ADDRESS | TRANSMISSION SOURCE IP ADDRESS | TRANSMISSION SOURCE PORT | DESTINATION PORT | | |
| 1 | A | B | X | Y | FORWARD TO SW1 | 0 |
| 2 | A | C | X | Z | FORWARD TO SW5 | 2 |
| 3 | A | C | X | Z | FORWARD TO SW5 | 3 |
| 4 | A | C | X | W | FORWARD TO SW5 | 3 |
| 5 | A | D | X | Y | FORWARD TO SW5 | 3 |
| 6 | A | C | X | Y | FORWARD TO SW5 | 3 |
| 7 | C | C | X | Y | FORWARD TO SW5 | 3 |
| 8 | D | C | X | Y | FORWARD TO SW5 | 3 |
| 9 | E | C | X | Y | FORWARD TO SW5 | 3 |

FIG. 20

| MAC DA | | |
|---|---|---|
| MAC DA | | |
| MAC SA | | |
| MAC SA | TPID(81-00) | TYPE |
| VLAN ID | | Total Length |
| Ver/IHL | ToS | Flag/Frag Offset |
| Identification | | CheckSum |
| TTL | Protocol | |
| IP SA | | |
| IP DA | | |
| Source Port | | Destination Port |
| Sequence Number | | |
| Acknowledgment Number | | |
| Offset / Flags | | Window Size |
| CheckSum | | Urgent Pointer |
| Payload Data | | |

FIG. 21

| ACTION NAMES | CONTENTS OF ACTIONS |
|---|---|
| OUTPUT | OUTPUT TO SPECIFIED PORT |
| SET_VLAN_VID | ADD AND UPDATE VLAN Tag WITH SPECIFIED VLAN ID |
| SET_VLAN_PCP | ADD AND UPDATE VLAN Tag WITH SPEFICIED VALN Priority |
| STRIP_VLAN | REMOVE IEEE802.1q VLAN Tag |
| SET_DL_SRC | UPDATE MAC SA |
| SET_DL_DST | UPDATE MAC DA |
| SET_NW_SRC | UPDATE IP SA |
| SET_NW_DST | UPDATE IP DA |
| SET_TP_SRC | UPDATE TCP/UDP Source Port |
| SET_TP_DST | UPDATE TCP/UDP Destination Port |
| VENDOR | VENDOR DEFINITION ACTION |

FIG. 22

| NAMES OF VIRTUAL PORTS | MEANING |
|---|---|
| IN_PORT | MEANS PORT THAT HAS RECEIVED PACKET |
| NORMAL | REMOVE PACKET FROM CONTROL OF OpenFlow AND DELIVER PACKET TO PRE-EXISTING PROTOCOL PROCESSING (BRIDGE OR IP FORWARDING) |
| FLOOD | ALL PORTS IN Forwarding STATE OTHER THAN PORT THAT HAS RECEIVED PACKET |
| ALL | ALL PORTS OTHER THAN PORT HTAT HAS RECEIVED PACKET |
| CONTROLLER | ADDRESSED TO CONTROLLER VIA Secure Channel |
| LOCAL | SWITCH ITSELF GOES TO NETWORK STAC (= TO SOCKET) |

NETWORK SYSTEM, CONTROLLER, METHOD, AND PROGRAM

TECHNICAL FIELD

Description of Related Application

The present invention is based upon and claims the benefit of the priority of Japanese Patent Application No. 2009-232307 (filed on Oct. 6, 2009), the disclosure of which is incorporated herein in its entirety by reference.

The present invention relates to a network system, a controller, a method, and a program.

BACKGROUND

OFSs (Open Flow Switches), which may be said to be at the forefront of a programmable network architecture is currently under study for experimentation and practical utilization in university campuses, enterprise networks, or the like, for example. First, an OFS will be outlined. The switch includes a flow table for packet lookup and forwarding, and a secure channel for communication with a controller. The controller communicates with the switch over the secure channel using the OpenFlow protocol, and controls a flow at an API (Application Program Interface) level, for example. To take an example, when a first packet (first packet) arrives at the switch, the switch searches the flow table using header information of the packet. If no match (which is a mis-hit) is found, the switch forwards (forwards) the packet to the controller over the secure channel. The controller determines a path for the packet using network topology information managed by the controller, based on information on a destination and a source of the packet. Based on the determined path, the controller sets a flow table for each switch on the path. Second and subsequent packets hit the flow tables of the switches, and are not forwarded to the controller. Each the second and subsequent packets is directly forwarded to the subsequent switch defined by flow table entries. About details of the OFS including the following overview of the OFS, Non-patent Documents 1, 2, and the like may be referred to, for example.

As shown in FIG. 19, for example, the flow table of the switch includes for each flow a rule (Rule) to be matched against a packet header, an action (Action) that defines processing to be performed on each flow, and flow statistics (Statistics) information. Exact (exact) values and wildcards (wildcards) are used for the rule (Rule) to be matched against the packet header. The action (Action) is the one to be applied to a packet that matches with the rule. The flow statistics information is also referred to as an activity counter, and includes the number of active entries, the number of times of packet lookups, and the number of packet matches. The flow statistics information also includes, for each flow, the number of received packets, the number of received bytes, and an active period of the flow. The flow statistics information also includes, for each port, the number of received packets, the number of transmitted packets, the number of received bytes, the number of transmitted bytes, the number of reception drops, the number of transmission drops, the number of reception errors, the number of transmission errors, the number of received frame alignment errors, the number of reception overrun errors, the number of reception CRC (Cyclic Redundancy Check) errors, and the number of collisions. The packet received by the switch is matched (matched) against the rule of the flow table. When an entry that matches with the rule is found, the action of the matching entry is applied to the packet. When no matching entry is found, the packet is forwarded to the controller over the secure channel. The controller transmits to the switch a flow entry on which a path for the packet has been determined. The switch adds, changes, and deletes the flow entry of the switch.

A preset field of the packet header is used for matching (matching) against the rule of the flow table of the switch. The information used for the match includes MAC (Media Access Control), DA (MAC Destination Address), MAC SA (MAC Source Address), Ethernet type (TPID), VLAN ID (Virtual LAN(Local Area Network) ID), VLAN TYPE (priority level), IP SA (IP Source Address), IP DA (IP Destination Address, IP protocol, Source Port (TCP (Transmission Control Protocol)/UDP (User Datagram Protocol) source port or ICMP (Internet Control Message Protocol) Type), and Destination port (TCP/UDP destination port or ICMP Code) (refer to FIG. 20).

FIG. 21 shows examples of action names and contents of actions. OUTPUT means outputting to a specified port (interface). SET_VLAN_VID down to SEG_TP_DST mean actions for correcting the fields of the packet header. The switch forwards (Forwards) a packet to a physical port and to the following virtual ports. FIG. 22 illustrates the virtual ports. IN_PORT means outputting of the packet to an input port. NORMAL means processing the packet using a pre-existing forwarding path supported by the switch. FLOOD means forwarding the packet to all ports in the communication enabled state (Forwarding state) except the port from which the packet was delivered. ALL means forwarding the packet to the ports except the port from which the packet was delivered. CONTROLLER means encapsulating of the packet and sending the encapsulated packet to the controller over the secure channel. LOCAL means sending of the packet to the local network stack of the switch itself. The packet that matches with the flow entry where no action has been specified is dropped (discarded). In this specification, the flow information composed of the rule and the action as well as the flow statistics information of the flow entry is referred to as a "flow entity". In this specification, the flow statistics information is not treated as the subject matter of the invention. Hence, the flow statistics information is omitted from the flow entity, so that the rule and the action are shown as the flow entry. A table that stores the flow entity is referred to as a flow entity table.

Patent Document 1 discloses an IP flow multi-stage hash apparatus in which fine flow control is performed, and an increase in the number of flow tables is prevented. The apparatus has a flow table constituted from a table composed of destination IP addresses alone and a table composed of a combination of the destination IP addresses and source IP addresses. In this apparatus, the two tables is switched for use according to content of a flow, and a source IP address and the number of an L4 port are added and registered in stages. With this arrangement, the fine low control is performed, and the increase in the number of flow tables is thereby prevented. This apparatus, however, does not delete or change a flow.

[Patent Document 1]

JP Patent Kokai Publication No. JP2004-56340A

[Non-patent Document 1]

Nick McKeown et al., "OpenFlow: Enabling Innovation in Campus Networks", Mar. 14, 2008 <Internet URL: http://www.openflowswitch.org//documents/openflow-wp-latest.pdf>

[Non-patent Document 2]
"OpenFlow Switch Specification" Version 0.9.0. (Wire Protocol 0x98) Jul. 20, 2009 <Internet URL: http://www.openflowswitch.org/documents/openflow-spec-v0.9.0.pdf>

SUMMARY

As described above, in a network where each node is controlled by a controller to determine a path, the controller determines a path for forwarding a packet, and instructs setting a flow entity for forwarding the packet along the path, for each node on the path. However, the number of flow entity entries that can be registered in the flow entity table of each node is limited.

To take an example, matching (matching) of a packet header against the flow entity table at a switch centrally controlled by the controller may be implemented by hardware such as a CAM (contents addressable memory). Even if the controller newly sets a flow in this case when the flow entity table is in an overflow state, the flow entity table of the switch is full, so that a new flow entity corresponding to the flow cannot be registered. For this reason, the packet may be discarded. Consequently, packet forwarding performance and quality of the network may be deteriorated. In view of this problem as well, implementation of a function of reducing the number of registration of flow entities in a switch by flow shift and flow aggregation is desired.

As a result of intensive study, the inventor and other people related to the present invention have now devised a method whereby the number of flows that pass through a node, for which paths have been set, can be reduced and the number of flow entities to be registered in the node can be reduced. This method will be presented below.

It is noted that to flow aggregation means to aggregate a plurality of flows that pass through a node into one flow, and to aggregate a plurality of entries of flow information respectively corresponding to the plurality of flows registered in the node into one entry corresponding to the aggregated one flow.

In order to solve the problem, the invention disclosed in this application is schematically configured as follows.

According to the present invention, there is provided a network control method using a controller that controls flows of a plurality of nodes under control, the method comprising:

in shifting a flow that passes through a specific node onto a different alternative path which does not pass through the specific node passed through by the flow, finding a plurality of alternative candidate paths, each of which has a same source and a same destination as a path associated with the flow to be shifted and does not pass through the specific node passed through by the flow to be shifted;

determining the alternative path from the alternative candidate paths according to a predetermined criterion; and aggregating flows of at least a node on the alternative path, to which the flow passing through the specific node is shifted.

According to the present invention, there is provided a network system comprising:

a plurality of nodes for which flow control is performed by a controller; and the controller, wherein in shifting a flow that passes through a specific node onto a different alternative path which does not pass through the specific node passed through by the flow, the controller finds a plurality of alternative candidate paths, each of which has a same source and a same destination as a path associated with the flow to be shifted and does not pass through the specific node passed through by the flow to be shifted, the controller determines the alternative path from the alternative candidate paths according to a predetermined criterion, and the controller aggregates flows of at least a node on the alternative path, to which the flow passing through the specific node is shifted.

According to the present invention, there is provided a controller comprising:

a node state changing unit that controls a change in a state of each node under control;

a flow information setting unit that instructs to each node on a path associated with a flow, setting of flow information defining an operation on the flow at the node;

an alternative path calculation unit that, when a flow that passes through a specific node is shifted onto a different alternative path which does not pass through the specific node passed through by the flow, finds a plurality of alternative candidate paths, each of which has a same source and a same destination as a path associated with the flow to be shifted and does not pass through the specific node passed through by the flow to be shifted, and that determines the alternative path from the alternative candidate paths according to a predetermined criterion; and a path aggregation execution unit that aggregates flows of at least a node on the alternative path, to which the flow passing through the specific node is shifted.

According to the present invention, there is provided a program for causing a controller to execute:

a node state changing process that controls a change in a state of a node under control;

a flow information setting process that configures, in each node on a path associated with a flow, flow information defining an operation on the flow at the node;

an alternative path calculation process that, in shifting a flow that passes through a specific node onto a different alternative path, each of which has a same source and a same destination as a path associated with the flow to be shifted and does not pass through the specific node passed through by the flow to be shifted, and that determines the alternative path from the alternative candidate paths according to a predetermined criterion; and a path aggregation execution process that aggregates flows of node on the alternative path, to which the flow passing through the specific node is shifted.

According to the present invention, there is also provided a storage medium capable of being read by a computer, the storage medium storing the program above described.

According to the present invention, the number of flows that pass through a node and the number of entries of flow information to be registered in the node can be reduced.

Still other features and advantages of the present invention will become readily a .a rent to those skilled in detailed description in conjunction with the accompanying embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be retarded as illustrative in nature, and not as restrictive.

BRIEF DESCRIPTION OF THE DRAWINGS

FIG. 17A and FIG. 17B are tables explaining determination of an aggregatable flow entity;

FIG. 20 is a table explaining a field of a packet header used for matching;

FIG. 21 is a table illustrating an action (Field Modify) of a flow entity; and

FIG. 22 is a table illustrating an action (virtual port) of the flow entity.

PREFERRED MODES

Exemplary embodiments of the present invention will be described.

In the present invention, when a flow that passes through a node (such as a switch 10 in FIG. 1) is shifted onto a different alternative path which does not pass through the node passed through by the flow and passes through a different node, a controller 20 which controls a flow at each node (such as a switch 10 in FIG. 1) under control determines alternative candidate paths that have a same source and a same destination as a path associated with the flow to be shifted and do not pass through the node passed through by the flow to be shifted, determines the alternative path from the alternative candidate paths according to a predetermined criterion, and aggregates flows of each node on the alternative path.

Figure 1:
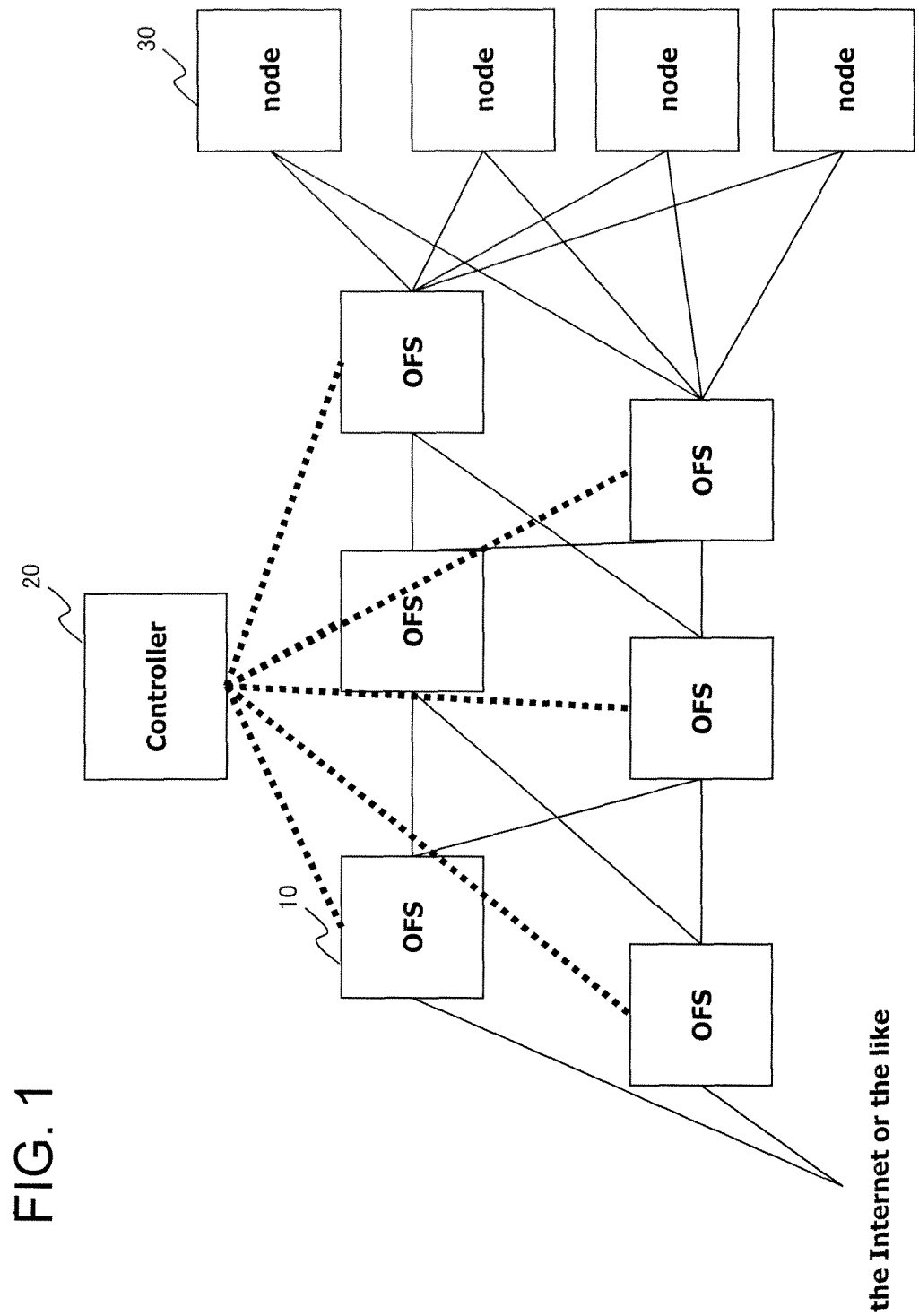
FIG. 1 is a diagram illustrating a configuration of a network system in an exemplary embodiment of the present invention.

In the present invention, the controller includes: a state changing unit (switch state changing unit 206) that controls a change in a state of each node under control (such as the switch 10 in FIG. 1);

a flow information setting unit (flow entity setting unit 202) that configures, in each node on a path associated with a flow, flow information defining an operation on the flow at the node;

an alternative path calculation unit (210) that, when a flow that passes through one node is shifted to a different alternative path that does not pass through the node passed through by the flow, determines a plurality of alternative candidate paths that have a same source and a same destination as a path associated with the flow to be shifted and that do not pass through the node passed through by the flow to be shifted, and determines the alternative path from the alternative candidate paths according to a predetermined criterion; and a path aggregation execution unit (207, 208) that aggregates flows of each node on the alternative path.

In the present invention, the controller (20) instructs each node on the path associated with the flow to set flow information that defines an operation on the flow at the node; and each node (switch 10 in FIG. 1) holds the number of entries of flow information corresponding to the number of entries of flow information corresponding to the number of flows that pass through the node according to the instruction from the controller (20). In aggregating flows of nodes on the alternative path, the controller (20) aggregates each entry of flow information associated with the flow of each node on the alternative path.

In the present invention, the controller (20) determines the alternative path from among the alternative candidate paths, based on the number of entries of flow information in each node on each of the alternative candidate paths. In this case, the controller (20) may calculate the sum of numbers of entries of flow information in the respective nodes on each of the alternative candidate paths, and may determine one of the alternative candidate paths having the sum of numbers of entries of flow information smaller than any other alternative candidate path, as the alternative path. Alternatively, the controller (20) may find a maximum value of numbers of entries of flow information in the respective nodes on each of the alternative candidate flows, and may determine one of the alternative candidate paths having the maximum value of numbers of entries of flow information smaller than any other, as the alternative candidate path.

In the present invention, the controller 20 may determine the alternative path based on an amount of traffic on each node on each of the alternative candidate paths. In this case, the controller (20) may calculate the sum of traffic amounts of the respective nodes on each of the alternative candidate paths, and may determine one of the alternative candidate paths having the sum of traffic amounts smaller than any other alternative candidate path, as the alternative path. Alternatively, the controller may find a maximum value of traffic amounts on the respective nodes on each of the alternative candidate paths, and may determine one of the alternative candidate paths having the maximum value of traffic amounts smaller than any other alternative candidate path, as the alternative path.

In the present invention, the controller (20) may reference flow information already set in each node on each of the alternative candidate paths, finds to what degree entries of the flow information in each node on each of the alternative candidate paths may be aggregated with entries of the flow information associated with the flow to be shifted that passes through the node, and determines the alternative path from the alternative candidate paths.

In the present invention, the flow information includes at least a rule to be matched against a header of a packet supplied to the node and an action that defines an operation on the packet that matches with the rule including forwarding of the packet from the node. With respect to the rule and the action of the flow information in the node passed through by the flow, the controller (20) derives the number of matches in the rule for each of the nodes on each of the alternative candidate paths having an action that matches with the action of the entry of the flow information, and sets the entry of the flow information having a highest value of the number of matches to be aggregated.

In the present invention, when there are a plurality of the entries of the flow information having the same highest value of the number of matches, the controller (20) may classify the entries into a plurality of groups according to a combination of the matches with elements in the rule of the entry of the flow information at the node passed through by the flow. The controller (20) may set the entries of the flow information in one of the plurality of groups having the largest number of the entries to be aggregated. Then, the controller (20) may determine the alternative path, based on the sum of numbers of the entries of the flow information in the respective nodes on each of the alternative candidate paths to be aggregated.

In the present invention, the controller (20) creates, from the entries of the flow information in each node on the alternative path that may be aggregated, an entry of new flow information where a field of an element not matching with the rule is specified by a wildcard, and sets and registers the entry in the node. The node deletes from the node the entries of the flow information that may be aggregated.

In the present invention, when shifting the flow that passes through the node onto the alternative path, the controller (20) may aggregate flows that passes through the node and then shifts the aggregated flows onto the alternative path.

According to the present invention configured as described above, an increase in the number of entries of flow information in each node on the alternative path of a shift destination is reduced.

For this reason according to the present invention, an occurrence of a situation can he avoided where a storage region such as a table of a node for receiving flow information overflows and a new flow cannot be set for a packet that has newly arrived at the switch.

Further, according to the present invention, by shifting a flow that passes through a node onto a different alternative path which does not pass through the node passed through by the flow, the number of entries of flow information set in the node can be reduced.

Further, according to the present invention, by shifting a flow that passes through a node onto a different alternative path, maintenance, adjustment, and the like of a free port or the like can be performed at the node. By shifting the flow that passes through the node onto the different alternative path, the node can be removed from the network, and maintenance, adjustment, and the like of the node can be performed. Still further, according to the present invention, shifting flows to one side or the like (during night-time operation or the like) contributes reduction of power consumption as well. The following describes the exemplary embodiments. Though each node for which flow control is performed by the controller is described as a switch in the following exemplary embodiments, the node of the present invention is not of course limited to such a configuration.

<Network System Configuration>

FIG. 1 is a diagram illustrating an example of a network to which the present invention is applied. Referring to FIG. 1, each switch (OFS: Open Flow Switch) 10 holds flow information on one or more flows (each including a rule and an action and hereinafter referred to as a "flow entity") set through a controller (Controller) 20. The switch retrieves the rule relevant to an incoming packet from a flow entity table (flow table). When the incoming packet matches with the rule, the switch 10 executes the action associated with the rule. When the incoming packet does not match with any rule in the flow entity table, the switch (OFS) 10 notifies the mis-hit to the controller 20. Each flow has a priority level. The flow with a high priority level gets valid. Based on a packet sent from the switch (OFS) 10, the controller 20 calculates a proper path for the packet, create a flow, and instructs the switches that form the path to set the flow. The connection configuration of the switches (OFSs) 10 in FIG. 1 is just an example, and a plurality of paths as in Fat Tree, Hyper Cube, or the like may exist. Each of nodes (Nodes) 30 in FIG. 1 has two or more network interfaces, such as server, load balancer, firewall, storage (NAS (Network Attached Storage), SAN (Storage Area Network) or node of distributed storage such as cluster storage. Referring to FIG. 1, the node 30 is the one that is not subjected to flow-control by the controller that exercises flow control over the multiple switches 10. The node 30 may of course include a function of communicating with the controller 20. It is so described, for simplicity, that the one controller 20 is configured to control the switches 10 in FIG. 1. It may also be so configured that a plurality of the controllers control one or more of the switches under control.

In the exemplary embodiment of the present invention, the controller 20 holds connection states of the switches 10 and the nodes 30 as topology information. The controller 20 also holds information on each set path as valid path information.

The controller 20 manages passing of each flow through the path. A MAC address, an IP address, the number of a port, or the like may be used for identifying the flow. Aggregation herein means handling a plurality of packet flows having a same destination address of packet headers to be matched against the rule of a flow entity, as one flow. The other fields of the plurality of packet flows are different to one another. In this case, the fields other than the field of the destination address are treated as any (arbitrary). A wildcard is set, as the rule of the flow entity.

<Path Rerouting and Flow Aggregation>

Figure 2:
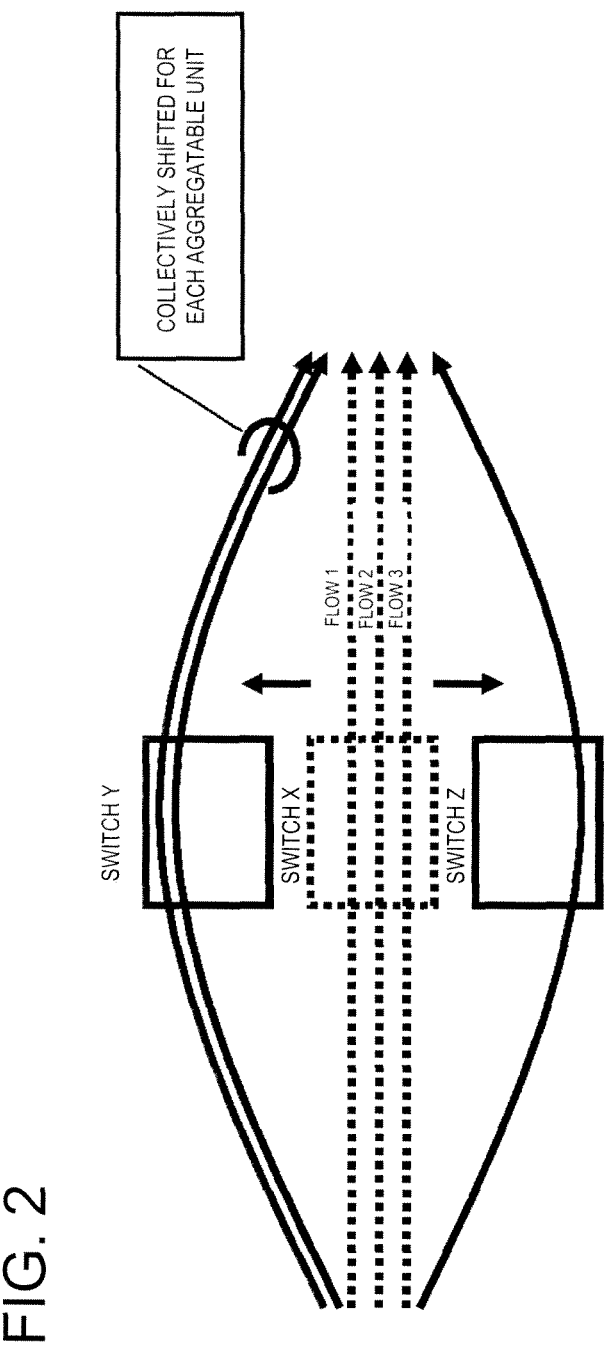
FIG. 2 is a diagram explaining aggregation of flows in the present invention.

When path re-routing is performed in the exemplary embodiment of the present invention, as shown in FIG. 2, the number of entries in the flow entity table of a switch is reduced by taking flow aggregation into consideration. When the controller 20 shifts flows 1, 2, 3 that pass through a switch X to different flows in the example shown in FIG. 2, the controller 20 shifts the flows 1 and 2 to a flow that will pass through a switch Y, because the flows 1 and 2 can be aggregated into one flow. Then, the controller 20 shifts the flow 3 to a flow that will pass through a switch Z. Flow shift is performed according to the following two modes.

(A) When shifting flows passing through a specific switch to different flows, the flows that pass through the specific switch are put together and are then shifted for each aggregatable flow.

(B) A switch candidate at a shift-destination is referenced, and the flow shift is determined, in view of aggregation with a pre-existing flow passing through each switch.

In the case of the (A) mode, the flows shift from a shift-source for each aggregatable unit. Accordingly, an increase in the number of flow entities at the switch of a shift-destination for each aggregatable flow is one entry. On the other hand, in the case of the (B) mode, a new flow entity is not created for a shifted flow at the switch of the shift-destination, and is aggregated into pre-existing flow entities. Thus, an increase in the number of flow entities can be reduced.

A mixture of the (A) and (B) modes may be used. In this case, flows are collectively shifted to reach a shift-destination for an aggregatable unit, and the flows can be aggregated with a pre-existing flow passing through the switch of the shift-destination. For this reason, even after the flow shift, an increase in the number of flow entities can be reduced at the switch of the shift-destination.

Referring to FIG. 2, only one flow passing through the switch X may be shifted to a flow that will pass through the different switch, and the other flows may be set to pass through the switch X. Alternatively, all the flows passing through the switch X may be shifted to a different path. This means that the switch X is removed from the path on the network and all the flows are bypassed to the different path.

<Flow Aggregation>

Next, an overview of flow aggregation will be described.

The controller 20 receives information on the specified switch of a shift-source from a manager. The controller 20 brings together flows that pass through the switch of the shift-source for each of the flows having a same exit (having a same destination IP address, for example).

The following processes are performed for each group of the flows that have been brought together. The controller 20 determines alternative candidate switches that will become a shift-destination.

The controller 20 determines an optimal shift-destination switch from the shift-destination candidate switches.
- A switch with a smallest load is determined to be the optimal switch.
- The number of flows that pass through each switch having the same exit as the flows used for the transfer is counted. The switch with the largest number of the flows having the same exit is determined to be the optimal switch of the shift-destination.

The controller 20 changes routing of the flows used for the transfer so that the flows used for the transfer pass through the switch of the shift-destination. Flow entities of the flows used for the transfer are aggregated into one flow entity. The flow entity in the aggregated state is registered in the flow entity table of the switch of the shift-destination. In this case, a flow at the switch of the shift-destination as well that can be aggregated is aggregated into the flows that are being transferred, if possible.

<Configuration Example of Controller>

Figure 3:
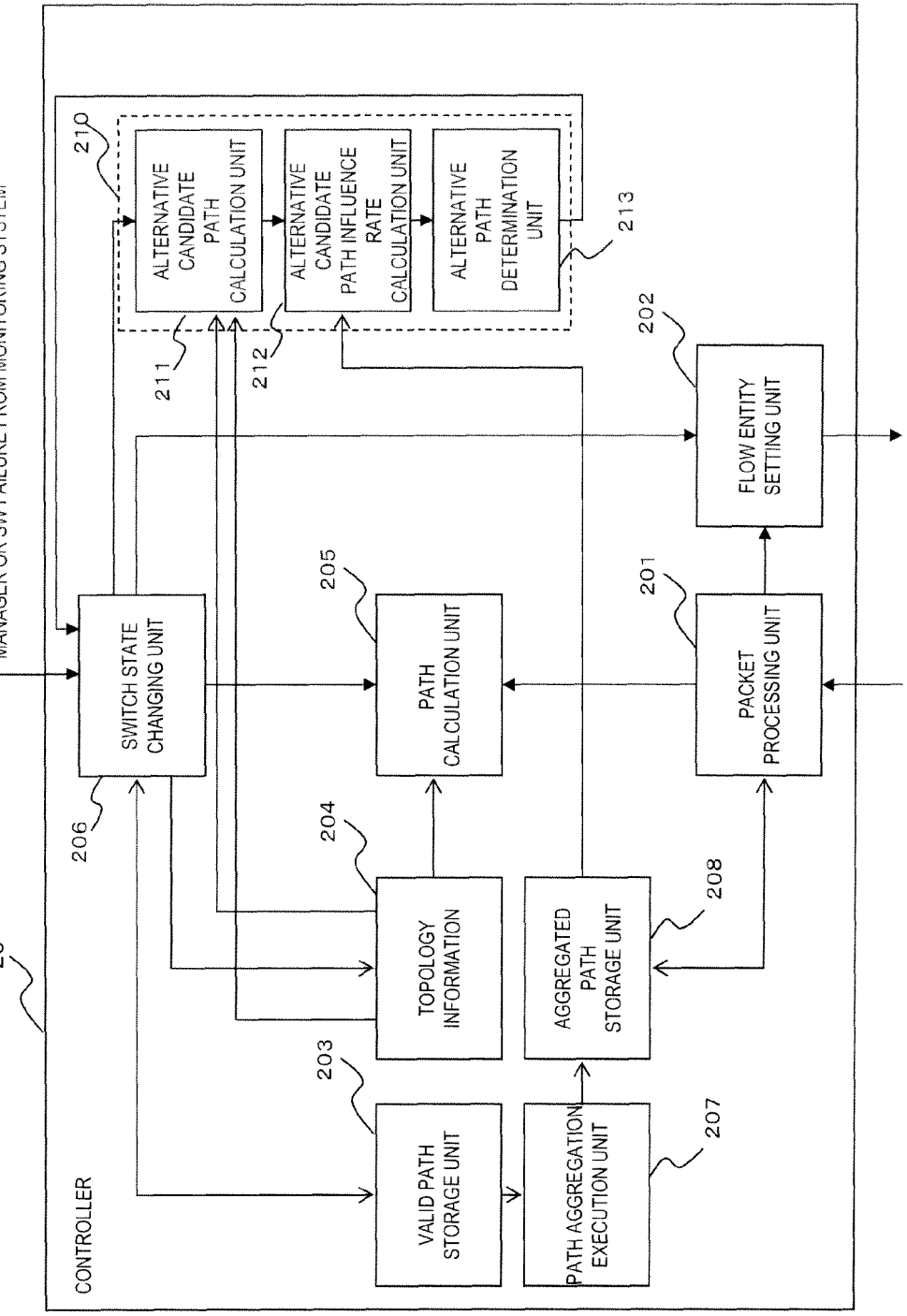
FIG. 3 is a diagram illustrating a configuration of a controller in the exemplary embodiment of the present invention.

The following describes a configuration of the controller 20 in FIG. 1. FIG. 3 is a diagram illustrating a configuration of the controller 20. The controller 20 includes a packet processing unit 201 that receives a packet from the switch 10, a flow entity setting unit 202 that sets a flow entity for the switch 10, a valid path storage unit 203 that stores path configuration information (including information on each switch that receives a packet as a trigger to create a path, information on a header of the packet, information for identifying the switches forming the path, and corresponding flow entities), topology information 204 that stores the network topology of nodes and the switches, a path calculation unit 205 that calculates a path, a switch state changing unit 206 that changes a state of the switch, a path aggregation execution unit 207 that aggregates paths, an aggregated path storage unit 208 that stores the aggregated paths, and an alternative path calculation unit 210 that calculates a path including an alternative switch that will become a shift-destination. The alternative path calculation unit 210 includes an alternative candidate path calculation unit 211 that calculates an alternative candidate path having a same source and a same destination as a flow used for transfer by referencing the topology information 204, an influence rate calculation unit 212 that calculates the influence rate of the alternative candidate path, and an alternative path determination unit 213 that determines an alternative path from the influence rate of each alternative candidate path. Respective functions of the units of the controller 20 may be of course implemented by a program to be run on the controller (computer) 20.

<Configuration Example of Switch>

Figure 4:
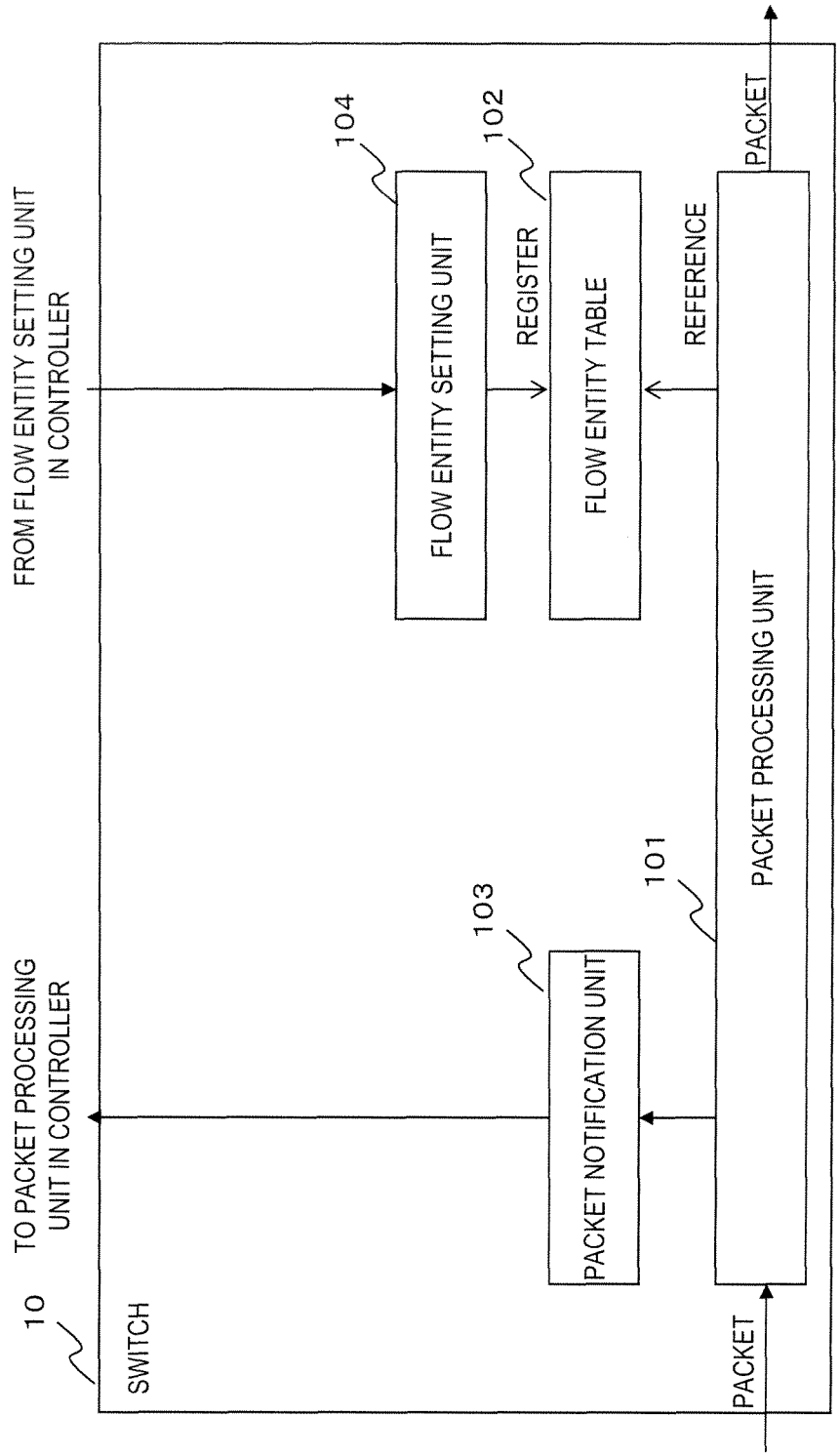
FIG. 4 is a diagram illustrating a configuration of a switch in the exemplary embodiment of the present invention.

FIG. 4 is a diagram illustrating a configuration example of the switch 10. The switch 10 includes a packet processing unit 101, a flow entity table (also referred to as a "flow table") 102, a packet notification unit 103 that notifies a first packet to the controller, and a flow entity setting unit 104 that sets a flow entity as instructed by the controller. A layer 2 switch, a layer 3 switch, or a node that operates as a router or the like, which can function as an OFS, can be used as the switch 10.

<Valid Path Storage Unit>

Figure 5:
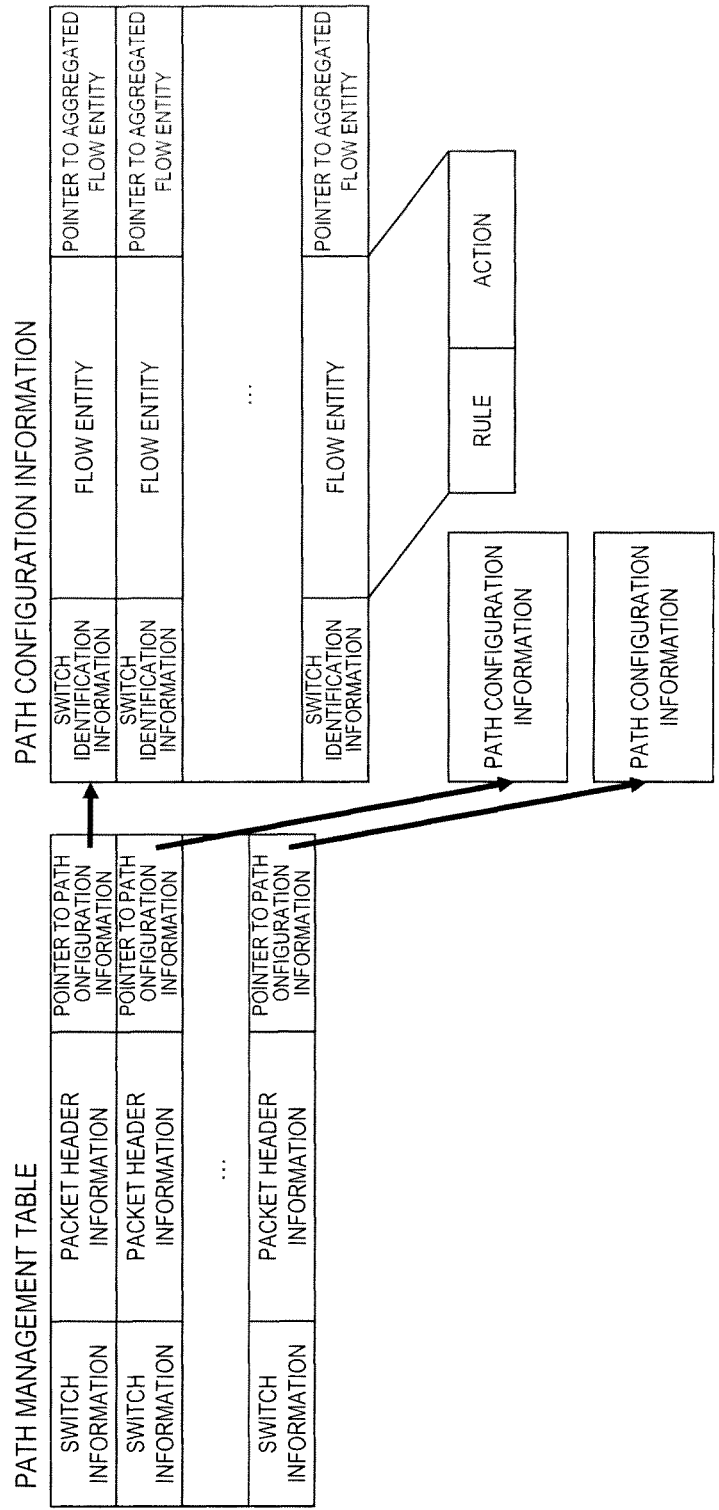
FIG. 5 is a diagram illustrating an example of a data structure in a valid path information storage unit of the controller in the exemplary embodiment of the present invention.

Next, the information stored in the valid path storage unit 203 will be described. FIG. 5 is a diagram illustrating an example of a data structure of data stored in the valid path storage unit 203.

<Path Management Table>

A path management table is a table that manages the path configuration information for each path. In the path management table, one path corresponds to one entry, and the path configuration information on the one path corresponds to the one entry. Each entry of the path management table includes the information (such as a switch ID or interface) of a switch that forms a path and has received a packet which is a trigger for causing the controller 20 to newly create the path, header information on the packet, and a pointer that points to the path configuration information corresponding to the path. The IP addresses of a source and a destination may be recorded as the header information on the packet.

<Path Configuration Information>

The path configuration information includes, for each path, a set of switch identification information and a flow entity of each of the switches that form the path (switches at start, intermediate, and end points of the path). When the path is formed of n switches, the path has the path configuration information including n sets of switch identification information, a flow entity set in each of the n switches, and a pointer pointed to an aggregated flow entity for each of the n switches. Each of the n sets is pointed to by the pointer of a corresponding entry of the path management table. By referencing the path configuration information, it can be seen which switches form a currently valid path. Each flow entity includes the rule and the action (and may include flow statistics information). The path configuration information may be configured in a table format, or may be configured as a linear list (linked list) in which a set of the switch information and the flow entity includes a pointer that points to another set of the switch information and the flow entity for the subsequent switch on the path. When a new path is calculated by the path calculation unit 205, the switch state changing unit 206 registers the path configuration information in the path management table of the valid path storage unit 203. The path which has been invalidated due to path deletion or the like is deleted from the valid path storage unit 203 by the switch state changing unit 206.

<Aggregated Path Storage Unit>

Figure 6:
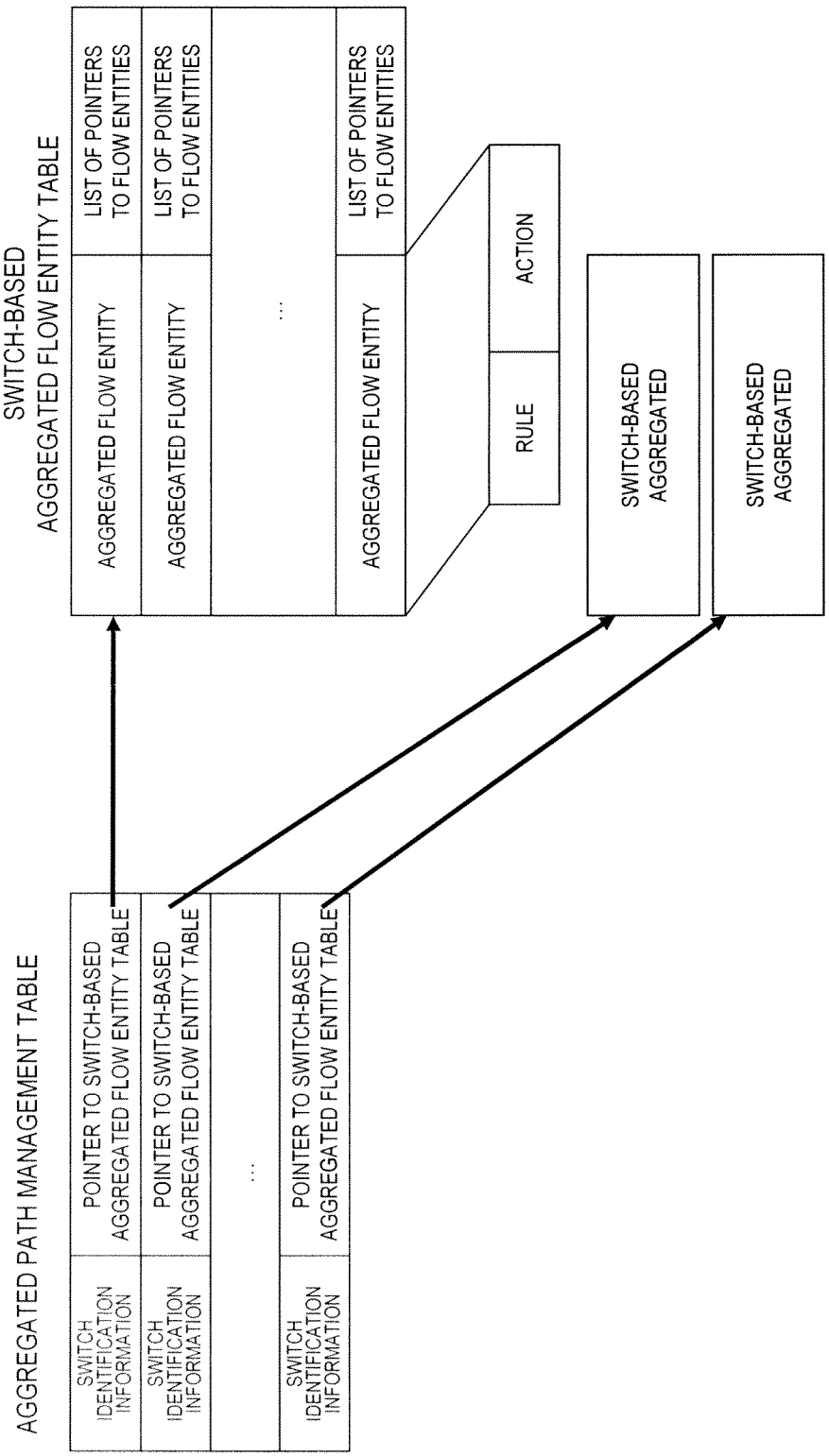
FIG. 6 is a diagram illustrating an example of a data structure in an aggregated path storage unit of the controller in the exemplary embodiment of the present invention.

The aggregated path storage unit 208 stores the path configuration information aggregated by the path aggregation execution unit 207. FIG. 6 is a diagram illustrating an example of a structure of data stored in the aggregated path storage unit 208. An aggregated path management table includes, for each switch, identification information on the switch and a point that points to a switch-based aggregated flow entity table (pointer to the switch-based aggregated flow entity table).

The switch-based aggregated flow entity table is a table that stores a plurality of sets, each of which includes an aggregated flow entity and a list of pointers to flow entities associated with the aggregated flow entity. A plurality of the aggregated flow entities in the aggregated flow entity table stored and held in the aggregated path storage unit 208 of the controller 20 are actually set and registered in the corresponding switch 10.

The list of pointers to the flow entities provided corresponding to each aggregated flow entity is a list where a plurality of pointers (so-called back pointers) is stored. Each of the pointers indicates the flow entity (in FIG. 5) aggregated into the aggregated flow entity.

When the number of the pointers stored in the list of pointers to the flow entities is two or more, the aggregated flow entity corresponding to the list of pointers to the flow entities is created by aggregating a plurality of the flow entities pointed to by the pointer into the aggregated flow entity. When the number of the pointers in the list of pointers to the flow entities is one, the flow entity pointed to by the pointer is the flow entity that is not aggregated.

When the number of the pointers in the list of pointers to the flow entities is zero, the aggregated flow entity corresponding to the list of pointers to the flow entities is not actually referenced. Thus, the aggregated flow entity is deleted.

When the path calculated by the path calculation unit 205 is registered in the path management table (refer to FIG. 5), and then when the path configuration information is generated, the following operations are performed for each entry in the path configuration information.

First, the switch identification information in each entry in the path configuration information is referenced to select the corresponding switch-based aggregated flow entity table based on the aggregated path management table.

Further, information on the flow entity in the relevant entry is copied and stored in a new field of the switch-specific flow entity table. Further, the address of the entry is stored in the pointer to the flow entity.

Next, when a path is deleted from the path management table, the following operation is performed on each entry of the path configuration information on the deleted path.

The aggregated flow entity is referenced from the pointer to the aggregated flow entity in the entry of the path configuration information on the deleted path. The pointer to the relevant entry is deleted from the list of pointers to the flow entities corresponding to the aggregated flow entity. When the number of the pointers in the list of pointers to the flow entities becomes 0 as a result of this operation, the aggregated flow entity itself is deleted.

<Flow Entity Table>

Figure 7:
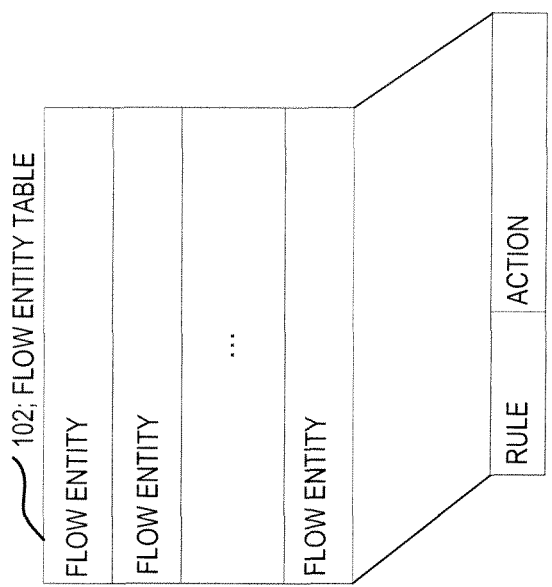
FIG. 7 is a diagram illustrating a flow entity table of each switch in the exemplary embodiment of the present invention.

FIG. 7 is a diagram illustrating a configuration example of the flow entity table 102 stored in the switch 10. The flow entity table is a table in which the flow entity specified by the controller 20 is stored and held by the switch 10. When n different flows pass through the switch 10, the switch 10 holds n flow entities corresponding to the respective flows. When flow reduction is performed according to this exemplary embodiment, one flow entity corresponds to a plurality of flows in a multiplexed manner. Referring to FIG. 7, it is set that flow entity=|rule|action|, illustrating that each flow entity is configured to include a single action. In this exemplary embodiment, one flow entity may be configured to include a plurality of actions. That is, it may be of course set that flow entity=|rule|action 1|action 2| . . . | action m| (m being a preset integer of two or more).

Each flow entity of the flow entity table 102 includes the rule and the action. The rule includes:
input interface (port)
MAC Source Address
MAC Destination Address
VLAN (Virtual Local Area Network) ID
TYPE
IP source address
IP destination address
protocol (UDP (User Datagram Protocol)/TCP (Transmission Control Protocol)/ICPM (Internet Control Message Protocol)); for ICMP, an ICMP type and an ICMP code being included, and for TCP/UDP, a source port and a destination port being included.

The action includes:
action type;
output (OUTPUT); and
modification of a field of a packet header (Field Modify)
FIG. 22 shows examples of the modification of a field of a packet header.

In case the action is OUTPUT, an output interface (port) is included.

In case the action is the modification of a field of a header, the modified field and the modified value are included.

Specified values may be respectively set to whole fields in the rule. A wildcard (wildcard) may be specified in each of the fields (fields). Then, the value of the field specified by the wildcard may be set to be masked at a time of matching against a flow entry (that is, the field specified by the wildcard always matches).

<Aggregation Operation of Controller>

Figure 8:
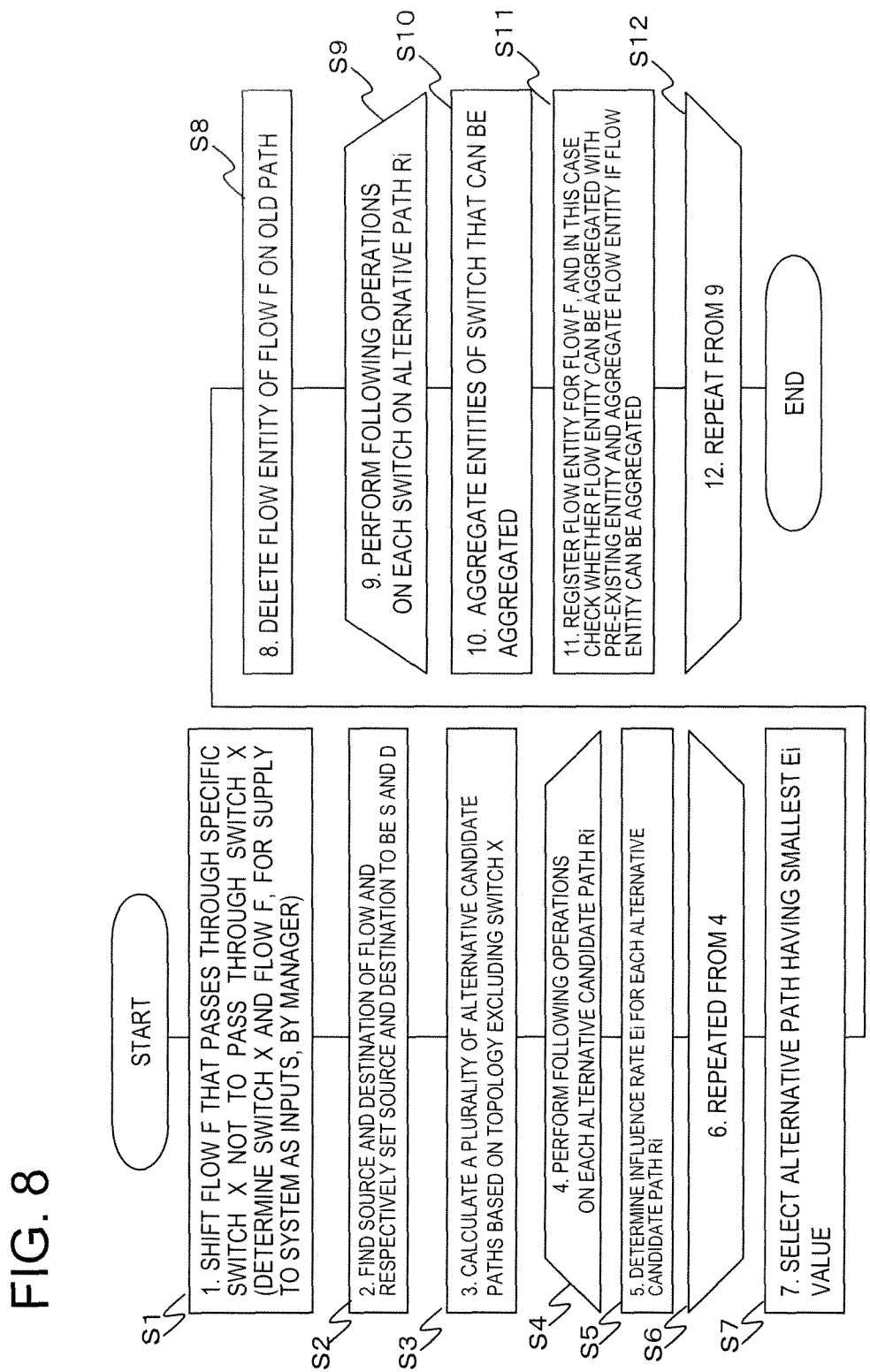
FIG. 8 is a flowchart showing operations in the exemplary embodiment of the present invention.

FIG. 8 is a flowchart explaining operation of the exemplary embodiment of the present invention.

First Step: A flow F that passes through a switch X is shifted so as not to pass through the switch X. That is, the manager supplies, to the switch state changing unit 206 of the controller 20, the switch X and the flow F to be shifted as inputs (in step S1).

Second Step: The switch state changing unit 206 of the controller 20 finds the source and the destination of the flow, respectively sets the source and the destination of the flow to be S and D, and causes the alternative path calculation unit 210 to calculate an alternative path (in step S2).

Third Step: The alternative candidate path calculation unit 211 of the alternative path calculation unit 210 references the topology information 204, and calculates an alternative candidate path, based on the topology information excluding the switch X (in step S3). In that case, a path having the same source and the same destination as the path for the flow F is set to be the alternative candidate path. The alternative candidate path calculation unit 211 may retrieve information on the source and the destination of transmission of header information on the packet which has become a trigger for creating the path registered in each entry of the path management table (in FIG. 5) of the valid path storage unit 203 and the switch identification information of the path configuration information pointed to by the entry, and may extract from pre-existing paths the alternative candidate path corresponding to the flow F that passes through the switch X. The valid path storage unit 203 stores valid path information. When the alternative candidate path cannot be found from the pre-existing flows, the alternative candidate path calculation unit 211 may notify an error (indicating that the alternative candidate path cannot be found) to the manager through the switch state changing unit 206, or may calculate a new alternative path by referencing the topology information 204.

Fourth Step: The influence rate calculation unit 212 of the alternative path calculation unit 210 performs the following Fifth Step on each alternative candidate path Ri (in step S4).

Fifth Step: The influence rate calculation unit 212 determines an influence rate Ei for each alternative candidate path Ri (in step S5).

Sixth Step: The steps from Fourth Step (of a loop) are repeated (in step S6).

Seventh Step: The alternative path determination unit 213 of the alternative path calculation unit 210 selects the alternative candidate path Ri having the smallest value of the influence rate Ei, as the alternative path, for example (in step S7).

Eighth Step: The switch state changing unit 206 instructs the flow entity setting unit 202 to delete the flow entity of the flow F in each switch of the old path in the valid path storage unit 20 (in step S8). The flow entity setting unit 104 of the switch 10 deletes from the flow entity table 102 the flow entity of which deletion has been instructed from the flow entity setting unit 202 of the controller 20.

Ninth Step: The following operations are performed on each switch of the alternative path Ri (in step S9).

Tenth Step: The path aggregation execution unit 207 aggregates each path that can be aggregated, and registers the aggregated path in the aggregated path storage unit 208 (in step S10).

Eleventh Step: The switch state changing unit 206 instructs the flow entity setting unit 202 to set the flow entity of each switch on the alternative path, and the flow entity setting unit 202 registers the flow entity of each switch 10 corresponding to the alternative flow (in step S11). The flow entity setting unit 104 of the switch 10 registers the flow entity set by the flow entity setting unit 202 of the controller 20 in the flow entity table 102. In this case, the switch state changing unit 206 of the controller 20 checks whether or not each flow entity can be aggregated with a flow entity already registered in the flow entity table of the switch, and the flow entity is aggregated if the flow entity can be aggregated.

Twelfth Step: The steps from Ninth Step are repeated (in step S12).

The influence rate in step S5 may be variously defined, as will be described later.

<Details of Path Aggregation>

Following describes an example of a processing procedure of the path aggregation execution unit 207 in step S10.

A description will be directed to a case where flow entities (E1 to En) set in each switch on the alternative path Ri are aggregated into one flow entity, as an aggregated flow entity (Ax), for registration.

First Step: The pointer to an aggregated flow entity (refer to FIG. 5) is obtained from the entry of a flow entity (Ek, k=1~n) used for aggregation in the path configuration information in the valid path storage unit 203.

Second Step: The aggregated flow entity in the switch-specific flow entity table in the aggregated path storage unit 208 pointed to by the pointer of the aggregated flow entity Am is referenced, and the pointer that points to the flow entity (EK) used for aggregation is deleted from the list of pointers to flow entities (refer to FIG. 6) associated with the aggregated flow entity.

Third Step: If the number of pointers in the list of pointers to the flow entities associate with the aggregated flow entity in the switch-based aggregated flow entity table becomes zero in the aggregated path storage unit 208 in Second Step, the aggregated flow entity is deleted. Further, the path aggregation execution unit 207 instructs the flow entity setting unit 202 to delete the aggregated flow entity from the switch.

Fourth Step: If the steps from First Step to Third Step are not executed on all the flow entities (E1 to En) used for aggregation, the operation is returned to First Step (repetitive processes for the flow entities E1 to En).

Fifth Step: The aggregated flow entity (Ax) is newly added to the switch-based aggregated flow entity table corresponding to the switch in the aggregated path management table in the aggregated path storage unit 208. Further, the path aggregation execution unit 207 instructs the flow entity setting unit 202 to add the aggregated flow entity (Ax) to the switch.

Sixth Step: Pointers to the flow entities (E1 to En) are stored in the list of pointers to the flow entities associated with the aggregated flow entity (Ax) in the aggregated path storage unit 208.

Seventh Step: A pointer to the aggregated flow entity (Ax) is stored as the pointer to the aggregated flow entity associated with each of the flow entities (E1 to En) of the path configuration information in the valid path storage unit 203.

<Configuration Example of Network>

Figure 9:
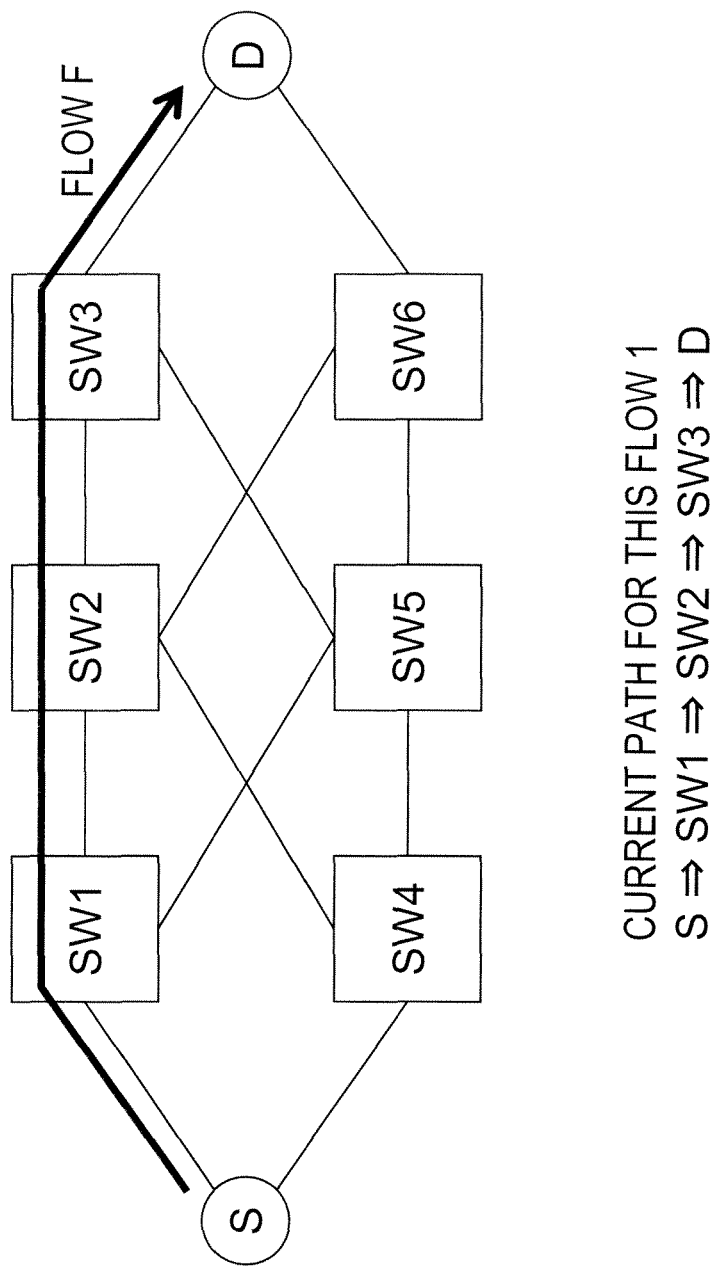
FIG. 9 is a diagram illustrating an example of a network topology and a flow.

FIG. 9 is a diagram illustrating a configuration of a network to which the present invention is applied, Hereinafter, a description will be given about a case where the flow F that passes through a switch SW2 is shifted in FIG. 9. The source node or switch of the flow F is indicated by S, and the destination (destination) node or switch of the flow F is indicated by D. Each of the source and the destination may be represented by an IP address or a MAC address. A current path of this flow F (path for implementing the flow F of a packet) is:

$$S \Rightarrow SW1 \Rightarrow SW2 \Rightarrow SW3 \Rightarrow D$$

This path ($S \Rightarrow SW1 \Rightarrow SW2 \Rightarrow SW3 \Rightarrow D$) is registered in the path management table (refer to FIG. 5) of the valid path storage unit of the controller 20 as the header information on the packet which has become a trigger for creating the path and the path configuration information (including the switch information on and the flow entity of each switch that composes the path) pointed to by the pointer in the path management table.

In the network configuration shown in FIG. 9, it is assumed that the switch SW1 is connected to the source S, the switches SW2 and SW5 using three of interfaces not shown, the switch SW2 is connected to the switches SW1, SW4 SW6, and SW3 using four of the interfaces not shown, the switch SW4 is connected to the source S and the switches SW2 and SW5, using three of the interfaces not shown, the switch SW5 is connected to the switches SW4, SW1, SW3, and SW6, using four of the interfaces not shown, the switch SW3 is connected to the switches SW2, SW5, and the destination D, using three of the interfaces not shown, and the switch SW6 is connected to the switches SW2, SW5, and the destination D, using three of the interfaces not shown.

<Examples of Alternative Candidate Path>

Figure 10:
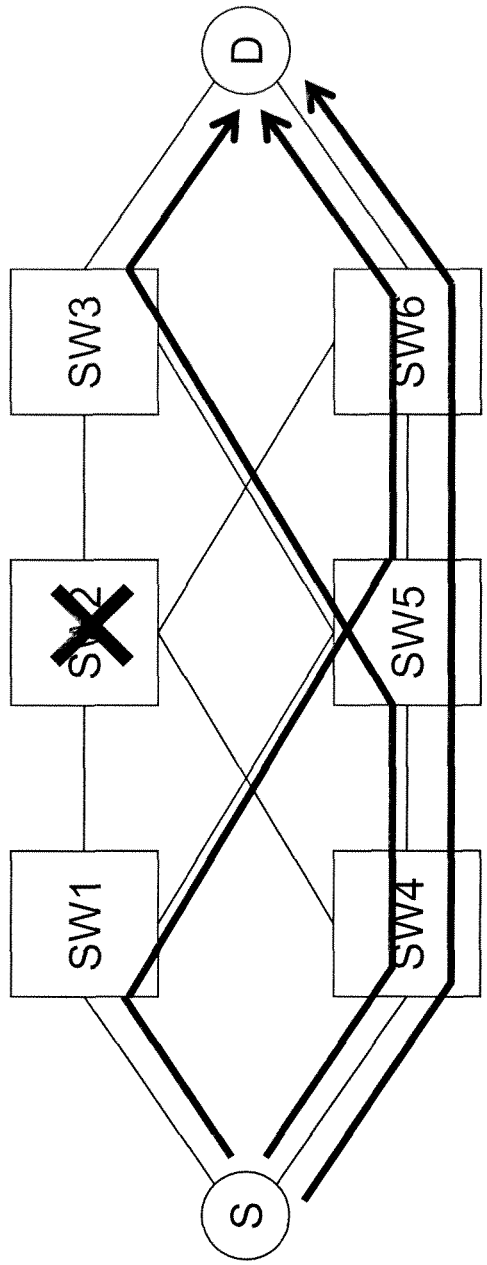
FIG. 10 is a diagram illustrating alternative candidate paths when a flow that passes through a switch is shifted.

FIG. 10 is a diagram explaining selection of an alternative candidate path by the alternative candidate path calculation unit 211 (in FIG. 3) of the alternative path calculation unit 210. The alternative candidate path having the same source (S) and the same destination (D) as the old path (flow F) is selected.

The alternative candidate path calculation unit 211 checks a source (S) and a destination (D) of a packet header which have been provided for each path in the path management table of the valid path storage unit 203 (refer to FIG. 5) and the packet of which has become a trigger for creating the path. In case the matching path having the same source (S) and the same destination (D) is found, the alternative candidate path calculation unit 211 searches the path configuration information pointed to by the entry in the path management table. In case the path does not include the switch SW2, the path may be derived as the alternative candidate path. Referring to FIG. 10, the following three paths were obtained, as the alternative candidate paths having the same source (S) and the same destination (D) and not including the switch SW2:
Alternative Candidate Path 1: S SW1 SW5 SW6 D
Alternative Candidate Path 2: S SW4 SW5 SW6 D
Alternative Candidate Path 3: S SW4 SW5 SW3 D When the alternative candidate path 1 is selected in step S4, in FIG. 8, for example, the influence rate of the alternative candidate path 1 with respect to the flow F at each of the switches SW1, SW5, and SW6 is found, and the sum of the influence rates is used an influence rate E1 of the overall alternative candidate path 1.

<Influence Rate 1>

Figure 11:
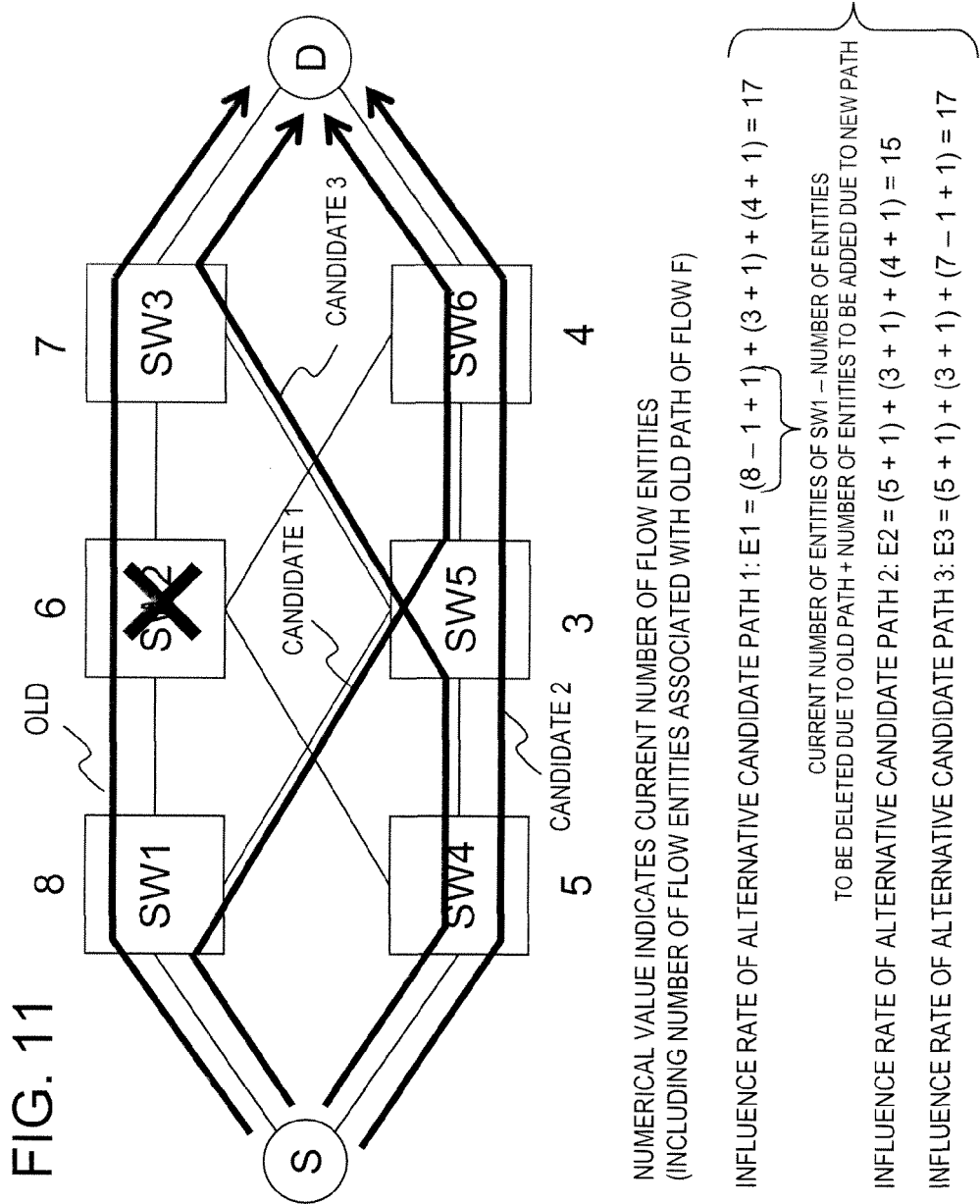
FIG. 11 is a diagram illustrating a case where a path is selected, using the number of flow entities in each switch for an influence rate.

FIG. 11 is a diagram explaining a first example of defining an influence rate Ei by the influence rate calculation unit 212. Referring to FIG. 11, the number of flow entities in the flow entity table 102 in each of the switches (SW1, SW3 to SW6) is set to be the influence rate. A numerical value added to each of the switches SW1 to SW6 in FIG. 11 is the current number of flow entities (including the number of flow entities associated with the old path of the flow F). Referring to FIG. 11, "old" denotes the old path, and "candidates 1, 2, and 3" denote the alternative candidate paths 1, 2, and 3.

The influence rate E1 of the alternative candidate path 1 (candidate 1 in FIG. 11: S SW1 SW5 SW6 D) is as follows:

$$E1=(8-1+1)+(3+1)+(4+1)=17 \quad (1)$$

where (8−1+1) denotes {the current number of flow entities (=8) in the switch SW1}−{the number of flow entities (=1) to be deleted due to the old path of the switch SW1}+{the number of flow entities (=1) to be added due to the new path of the switch SW1}.

(3+1) denotes {the current number of flow entities (=3) in the switch SW5}+{the number of flow entities (=1) to be added due to the new path of the switch SW5}. Since the switch SW5 is not on the old path, subtraction of the number of flow entities to be reduced due to the old path of the switch SW1 is not performed.

(4+1) denotes {the current number of flow entities (=4) in the switch SW6}+{the number of flow entities (=1) to be added due to the new path of the switch SW5}. Since the switch SW6 is not on the old path, subtraction of the number of flow entities to be reduced due to the old path of the switch SW1 is not performed.

An influence rate E2 of the alternative candidate path 2 (candidate 2 in FIG. 11: S SW4 SW5 SW6 D) is as follows:

$$E2=(5+1)+(3+1)+(4+1)=15 \quad (2)$$

where (5+1) denotes {the current number of flow entities (=5) in the switch SW4}+{the number of flow entities (=1) to be added due to the new path of the switch SW4}
Since the switch SW4 is not on the old path, subtraction of the number of flow entities to be deleted from the old path of the switch SW1 is not performed.

(3+1) denotes {the current number of flow entities (=3) in the switch SW5}+{the number of flow entities (=1) to be added due to the new path of the switch SW5}. Since the switch SW5 is not on the old path as described before, subtraction of the number of flow entities to be reduced due to the old path of the switch SW1 is not performed.

(4+1) denotes {the current number of flow entities (=4) in the switch SW6}+{the number of flow entities (=1) to be added due to the new path of the switch SW5}. Since the switch SW6 is not on the old path as described before, subtraction of the number of flow entities to be reduced due to the old path of the switch SW1 is not performed.

An influence rate E3 of the alternative candidate path 3 (candidate 3 in FIG. 11: S SW4 SW5 SW3 D) is as follows:

$$E3=(5+1)+(3+1)+(7-1+1)=15 \quad (3)$$

where (5+1) denotes {the current number of flow entities (=5) in the switch SW4}+{the number of flow entities (=1) to be added due to the new path of the switch SW4}

Since the switch SW4 is not on the old path, subtraction of the number of flow entities to be deleted from the old path of the switch SW1 is not performed.

(3+1) denotes {the current number of flow entities (=3) in the switch SW5}+{the number of flow entities (=1) to be added due to the new path of the switch SW5}. Since the switch SW5 is not on the old path as described before, subtraction of the number of flow entities to be reduced due to the old path of the switch SW1 is not performed.

(7−1+1) denotes {the current number of flow entities (=7) in the switch SW3}−{the number of flow entities (=1) to be deleted due to the old path of the switch SW7}+{the number of flow entities (=1) to be added due to the new path of the switch SW7}.

The alternative path determination unit 213 determines the alternative candidate path having the smallest influence rate among the alternative candidate paths 1, 2, and 3.

<Variation Example of Influence Rate 1>

As a variation example, a case may also be conceived where an increase in the number of flow entities in a switch due to a new path and a reduction in the number of flow entities in the switch due to an old path are not taken into consideration. In this case, the influence rate E1 of the alternative candidate path 1 (candidate 1 in FIG. 11: S SW1 SW5 SW6 D) is:

$$E1=8+3+4=15 \quad (4)$$

The influence rate E2 of the alternative candidate path 2 (candidate 2 in FIG. 11: S SW4 SW5 SW6 D) is:

$$E2=5+3+4=12 \quad (5)$$

The influence rate E3 of the alternative candidate path 3 (candidate 3 in FIG. 11: S SW4 SW5 SW3 D) is as follows:

$$E3=5+3+7=15 \quad (6)$$

In this case, the alternative candidate path 2 is determined as the alternative candidate.

<Influence Rate 2>

Figure 12:
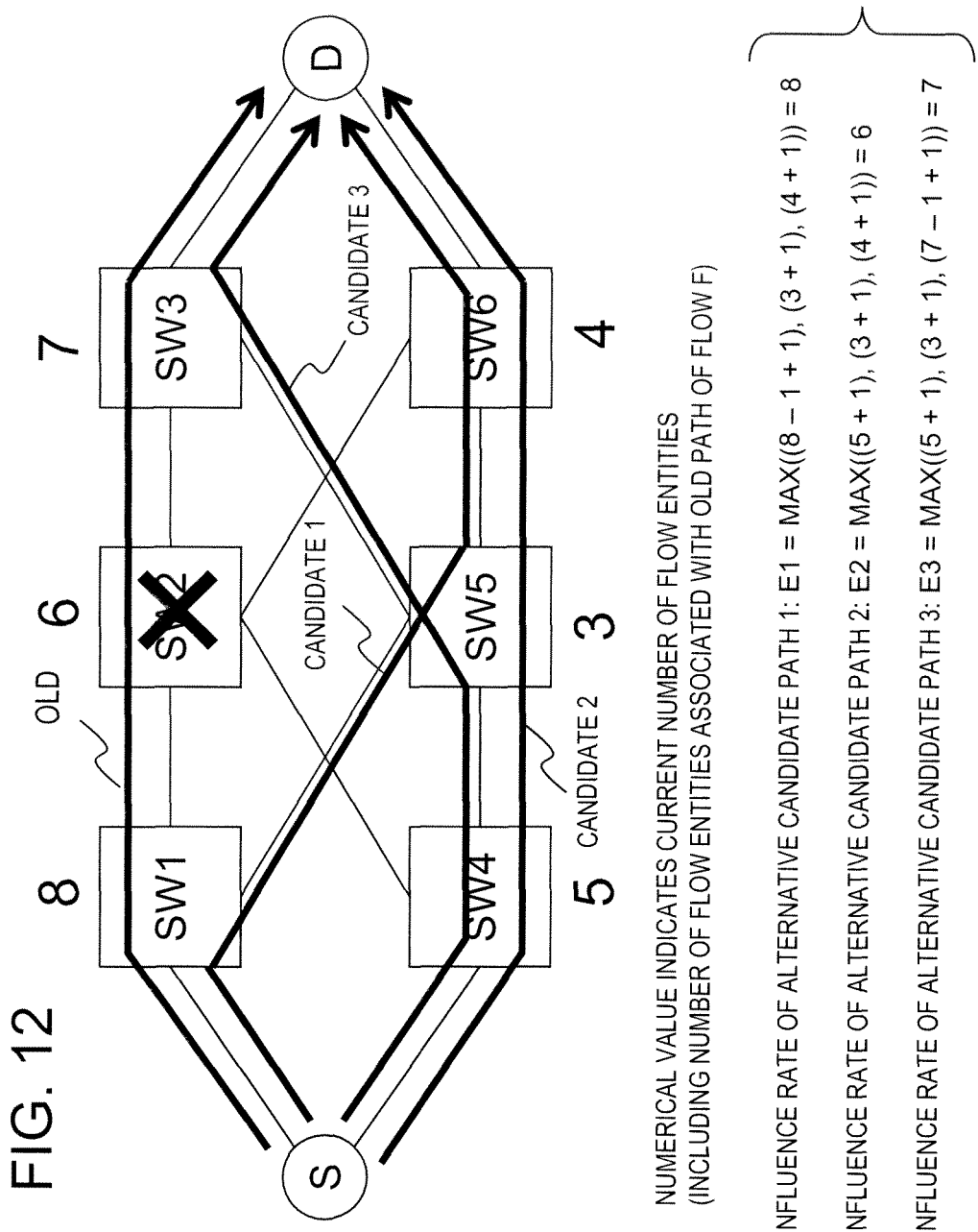
FIG. 12 is a diagram explaining a case where a path is selected, using a maximum value of the number of flow entities in each switch as the influence rate.

FIG. 12 is a diagram explaining a second example of defining an influence rate. In this example, a MAX (maximum) value of the number of flow entities is used as the influence rate. That is, a maximum value E2 of the number of flow entities of the flow entity table in each switch is set to the influence rate. Referring to FIG. 12, a numerical value added to each switch is the current number of flow entities (including the number of flow entities associated with the old path of the flow F).

The influence rate E1 of the alternative candidate path 1 (path 1 in FIG. 12: S SW1 SW5 SW6 D) is:

$$E1=MAX((8-1+1),(3+1),(4+1))=8 \quad (7)$$

MAX ( . . . ) indicates the maximum value of parameter elements. Since (8−1+1), (3+1), and (4+1) are the same as those in Equation (1), description of the parameter elements will be omitted.

The influence rate E2 of the alternative candidate path 2 (path 2 in FIG. 12:S SW4 SW5 SW6 D) is:

$$E2=MAX((5+1),(3+1),(4+1))=6 \qquad (8)$$

The influence rate E3 of the alternative candidate path 3 (path 3 in FIG. 12: S SW4 SW5 SW3 D) is:

$$E3=MAX((5+1),(3+1),(7-1+1))=7 \qquad (9)$$

The alternative path determination unit 213 determines the alternative candidate path 2 having the smallest influence rate among the alternative candidate paths 1, 2, and 3. As a variation example, the case as described above may also be considered where an increase in the number of flow entities in a switch due to a new path and a reduction in the number of flow entities in the switch due to an old path are not taken into consideration.

In the above-mentioned exemplary embodiment, the number of flow entities in a switch is used for calculation of the influence rate of an alternative candidate flow. An amount of traffic that passes through a switch may be used.

<Another Exemplary Embodiment>

Figure 13:
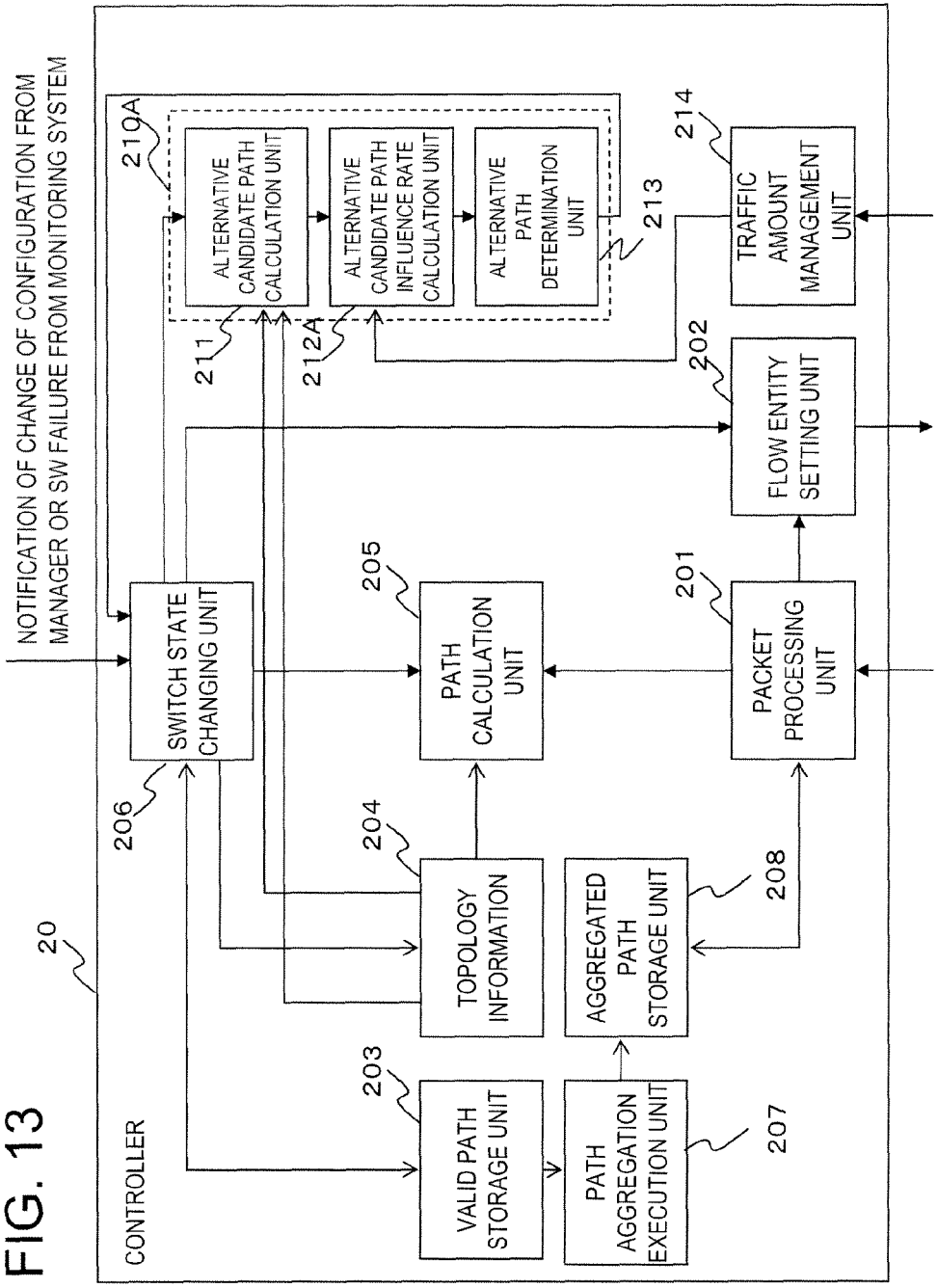
FIG. 13 is a diagram illustrating a configuration of a controller in another exemplary embodiment of the present invention.

FIG. 13 is a diagram illustrating a configuration example of a controller 20 in another exemplary embodiment of the present invention. In this exemplary embodiment, an amount of traffic is used for calculation of an influence rate. Referring to FIG. 13, the controller 20 is obtained by adding a traffic amount management unit 214 to the configuration in FIG. 3. An influence rate calculation unit 212A calculates an influence rate based on the amount of traffic of each switch notified from the traffic amount management unit 214.

Figure 14:
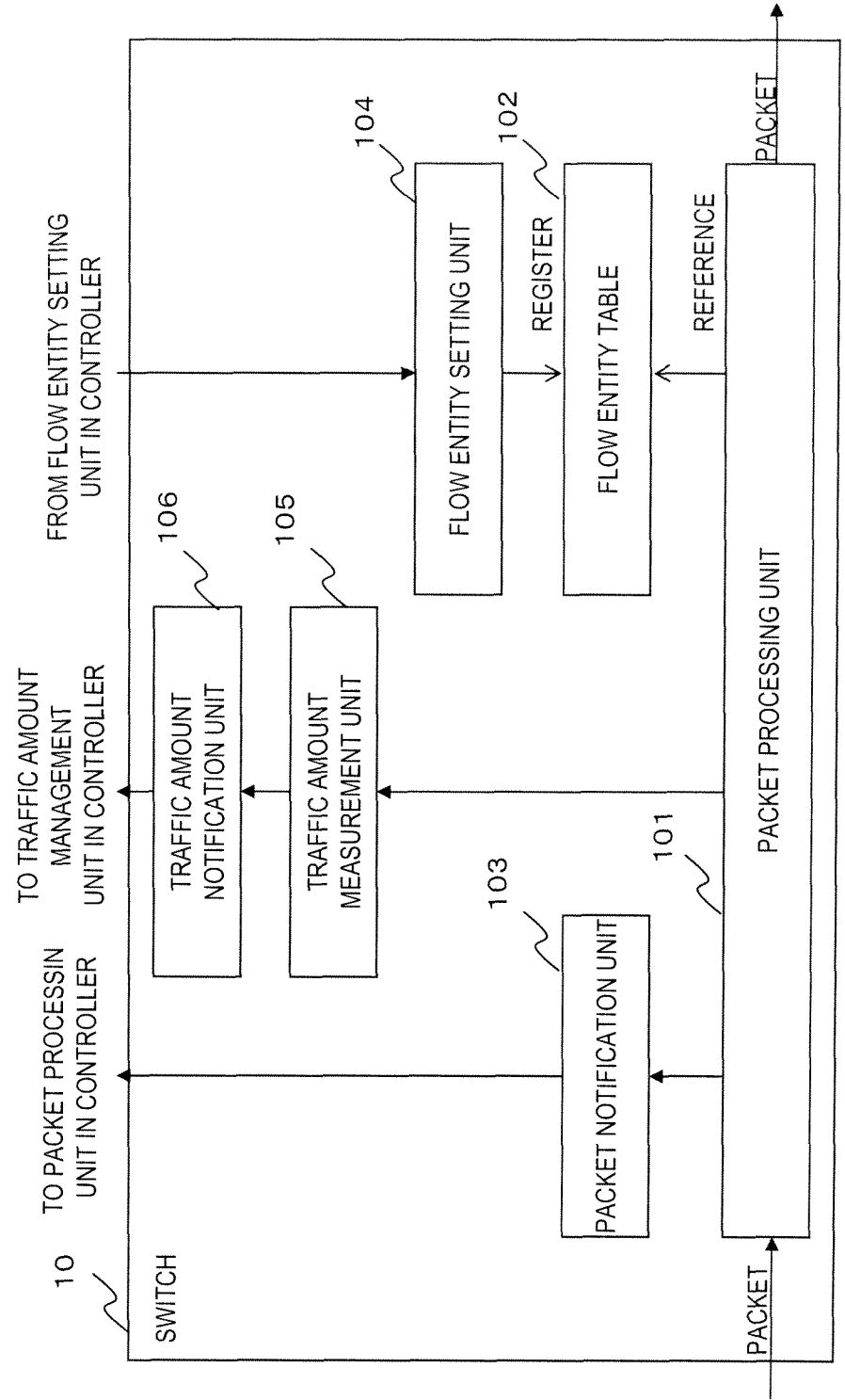
FIG. 14 is a diagram illustrating a configuration of each switch in another exemplary embodiment of the present invention.

FIG. 14 is a diagram illustrating a configuration of a switch 10. Referring to FIG. 14, the switch 10 has a traffic amount measurement unit 105 and a traffic amount notification unit 106 for notifying an amount of traffic to the controller 20 in addition to the configuration in FIG. 4. The traffic amount measurement unit 105 adds the size of at least one received packet for each predetermined unit of time to a counter (not shown). The traffic amount notification unit 106 notifies a value (received data amount) of the counter (not shown) to the controller 20 for each predetermined unit of time, and then clears the counter (not shown) to zero. The counter (not shown) may then immediately start counting of the size of a received packet, or may start counting of the size of the received packet after an elapse of a predetermined period of time. Alternatively, the traffic amount measurement unit 105 may average count results of sizes of received packets each measured for each predetermined unit of time on several occasions, and may notify the averaged amount of received data to the controller 20. Alternatively, the controller 20 may of course instruct the traffic amount measurement unit 105 of the switch 10 to start a counting operation of the size of a received packet. Examples of calculating an influence rate by the influence rate calculation unit 212A will be described below.

<Influence Rate 3>

Figure 15:
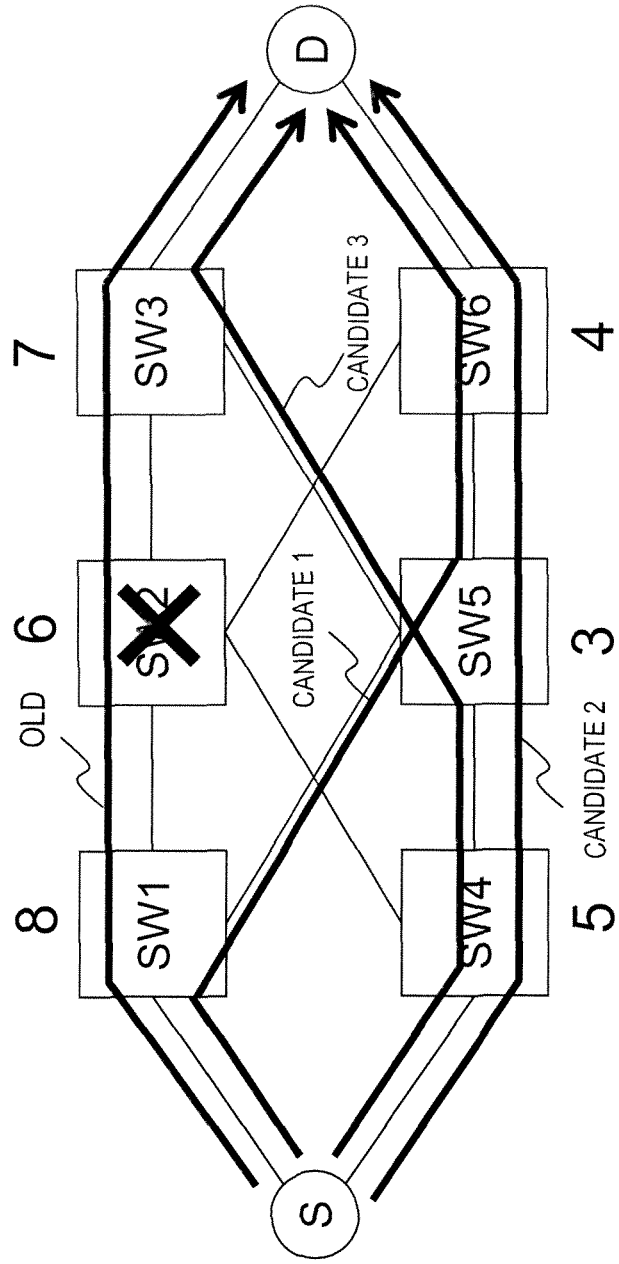
FIG. 15 is a diagram explaining a case where a path is selected, using an amount of traffic on each switch for an influence rate.

FIG. 15 is a diagram explaining an example in case an amount traffic is used as an influence rate of an alternative candidate path in the alternative candidate paths 1, 2, and 3 in FIG. 10. The sum of traffic amounts that passes through the respective switches of each alternative path per unit of time is set to the influence rate. Numerical values 8, 6, 7, 5, 3, and 4 added to the switches SW1, SW2, SW3, SW4, SW5, and SW6 in FIG. 15 respectively show amounts (relative amounts) of traffic that has passed through the respective switches per unit of time.

The influence rate E1 of the alternative candidate path 1 (path 1 in FIG. 15: S SW1 SW5 SW6 D) is:

$$E1=8+3+4=15 \qquad (10)$$

The influence rate E2 of the alternative candidate path 2 (path 2 in FIG. 15: S W4 SW5 SW6 D) is:

$$E2=5+3+4=12 \qquad (11)$$

The influence rate E3 of the alternative candidate path 3 (path 3 in FIG. 15: S SW4 SW5 SW3 D) is as follows:

$$E3=5+3+7=15 \qquad (12)$$

The alternative path determination unit 213 selects the alternative candidate path 2 having the smallest influence rate among the alternative candidate paths 1, 2, and 3.

<Variation Example of Influence Rate 3>

As a variation example, an amount of traffic of the switch on the path that is maximum may be set to the influence rate.

In this case, the influence rate E1 of the alternative candidate path 1 (path 1 in FIG. 15: S SW1 SW5 SW6 D) is:

$$E1=MAX(8,3,4)=8 \qquad (13)$$

The influence rate E2 of the alternative candidate path 2 (path 2 in FIG. 15: S SW4 SW5 SW6 D) is:

$$E2=MAX(5,3,4)=5 \qquad (14)$$

The influence rate E3 of the alternative candidate path 3 (path 3 in FIG. 15: S SW4 SW5 SW3 D) is:

$$E3=MAX(5,3,7)=7 \qquad 15)$$

In this case, an alternative path determination unit 213 selects the alternative candidate path 2 having the smallest influence rate among the alternative candidate paths 1, 2, and 3.

<Influence Rate 4>

Figure 16:
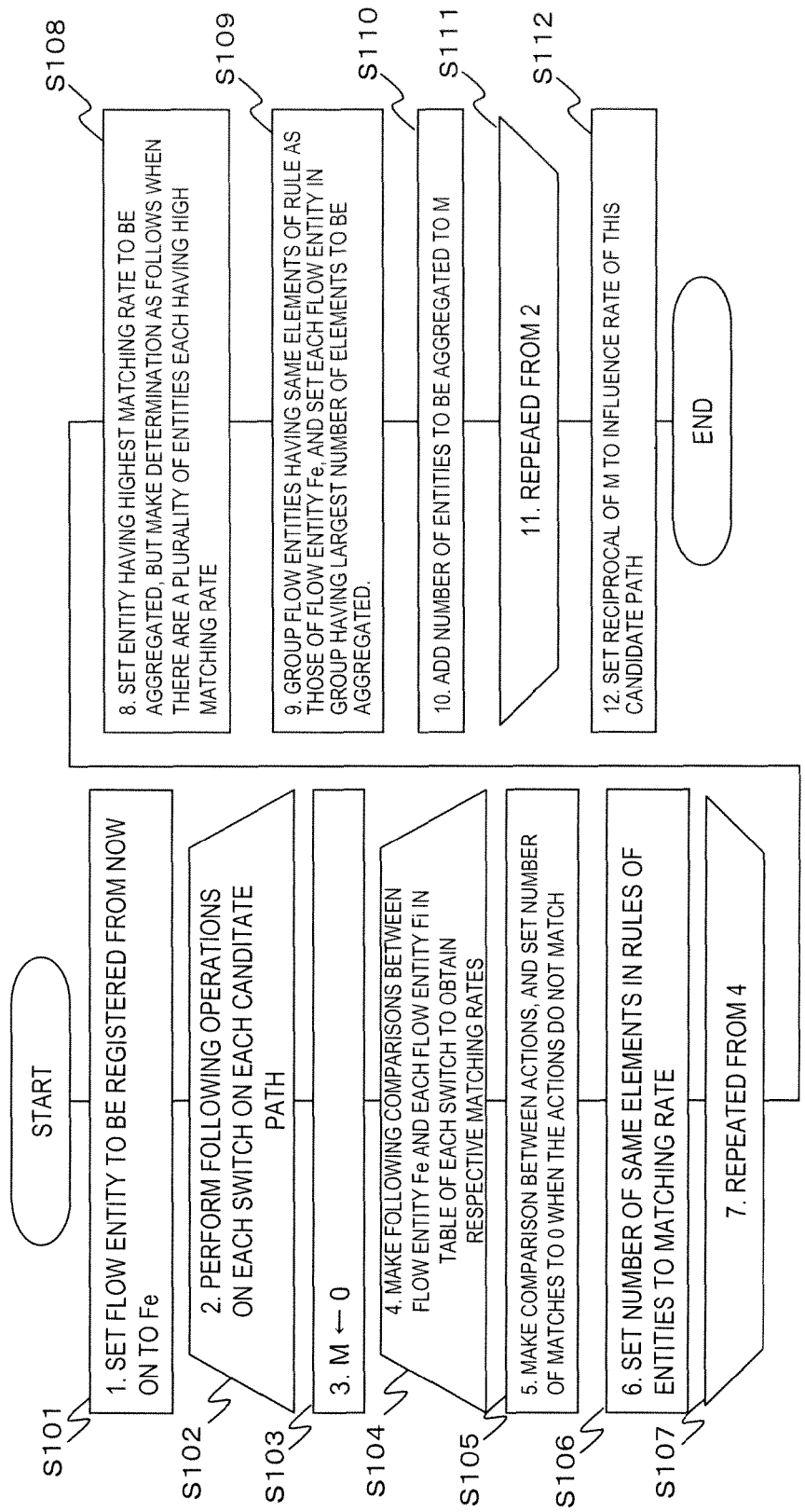
FIG. 16 is a flowchart explaining a procedure when a path is selected using the number of aggregatable flow entities for the influence rate.

Alternatively, the number of aggregatable flow entities in the flow entity table of each switch may be used for an influence rate of an influence rate calculation unit 212 in another exemplary embodiment of the present invention. FIG. 16 shows a procedure of the alternative candidate path influence rate calculation unit 212.

First Step: The flow entity of a flow of a switch (rule and action of the switch) to be shifted that will be registered from now on in the flow entity table of the switch is indicated by Fe (in step S101).

Second Step: The influence rate calculation unit 212 performs the following operations on each switch on each alternative candidate path for the flow, determined by an alternative candidate path calculation unit 211 (in step 102).

Third Step: M<--0 (in step S103)

Fourth Step: The following comparisons between the flow entity Fe and each flow entity Fi in the flow entity table of each switch on the alternative candidate path are made to obtain respective matching rates (in step S104).

Fifth Step: A comparison is made between actions of the flow entity Fe and each flow entity Fi in the flow entity table of each switch on the alternative candidate path. When the actions do not match, the number of matches (matching rate) is set to 0 (in step S105).

Sixth Step: The number of same elements in rules of the flow entity Fe and each flow entity Fi in the flow entity table of each switch on the alternative candidate path is set to the matching rate (in step S106).

Seventh Step: The steps from Fourth Step are repeated (in step S107).

Eighth Step: The flow entity having the highest number of matches is set to be aggregated with the flow entity Fe (into one flow entity) (in step S108). When there are a plurality of the flow entities each having a high matching rate, determination as follows is made.

Ninth Step: The flow entities having same elements of the rule as those of the flow entity Fe are grouped. Each flow entity in a group having the largest number of the elements that are the same as those of the flow entity Fe is set to be aggregated (into one flow entity) (in step S109).

Tenth Step: The number of the entities to be aggregated is added to M (in step S110).

Eleventh Step: The steps from Second Step are repeated (in step S111).

Step 12: The reciprocal of M is set to the influence rate of this alternate candidate path (in step S112). Setting the reciprocal of M to the influence rate in step S112 is to be consistent with the operation of selecting the alternative candidate having the minimum influence rate in step S7 in FIG. 8.

<Determination of Number of Aggregatable Entities>

FIGS. 17A and 17B are tables explaining about determination of the number of aggregatable entities, by the influence rate calculation unit 212, whose operation has been explained with reference to FIG. 16.

The flow entity (flow entity to be aggregated) to be registered is indicated by Fe, a destination IP address of the rule is indicated by A, a source IP address of the rule is indicated by C, a source port of the rule is indicated by X, and a destination port of the rule is indicated by Y. An action to be performed on a packet, whose packet header matches with this rule is forwarding to the switch SW5.

Since the action of a flow entity 1 of the flow entity table of the switch (to forward to the switch SW1) is different from the action of the flow entity Fe (to forward to the switch SW5), the number of matches is 0.

Since the action of a flow entity 2 (to forward to the switch SW5) matches with the action of the flow entity Fe (to forward to the switch SW5) and a source IP address and a source port of the rule of the flow entity 2 match with those of the flow entity Fe, the number of matches is two.

Actions of flow entities 3 to 9 (to forward to the switch SW5) match with the action of the flow entity Fe (to forward to the switch SW5), and the number of matches of each of the flow entities 3 to 9, which is the number of same elements as those of the flow entity Fe with respect to the rules is three. These flow entities are divided into the following three groups.

Group 1: Destination IP addresses, source IP addresses, and source ports of the flow entities 3 and 4 match with those of the flow entity Fe.

Group 2: Destination IP addresses, source ports, and destination ports of the flow entities 5 and 6 match with those of the flow entity Fe.

Group 3: Transmission source IP addresses, Transmission source ports, and destination ports of the flow entities 7, 8, 9 match with those of the flow entity Fe.

The number of the elements (of the flow entities 7, 8, and 9) of the group 3 is the largest. Accordingly, the group 3 is selected, and three is added to M. The flow entities 7, 8, and 9 and the flow entity Fe to be registered are aggregated into one flow entity.

<Setting of Aggregated Flow Entity and Deletion of Original Flow Entity>

Figure 18:
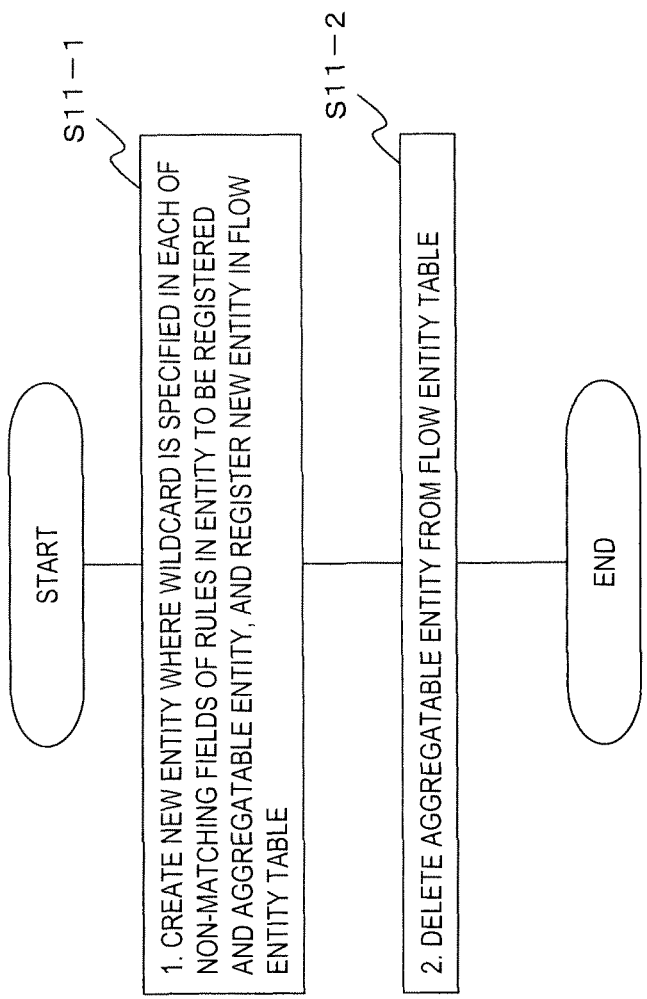
FIG. 18 is a diagram illustrating a procedure of step S11 in FIG. 8.
Figure 19:
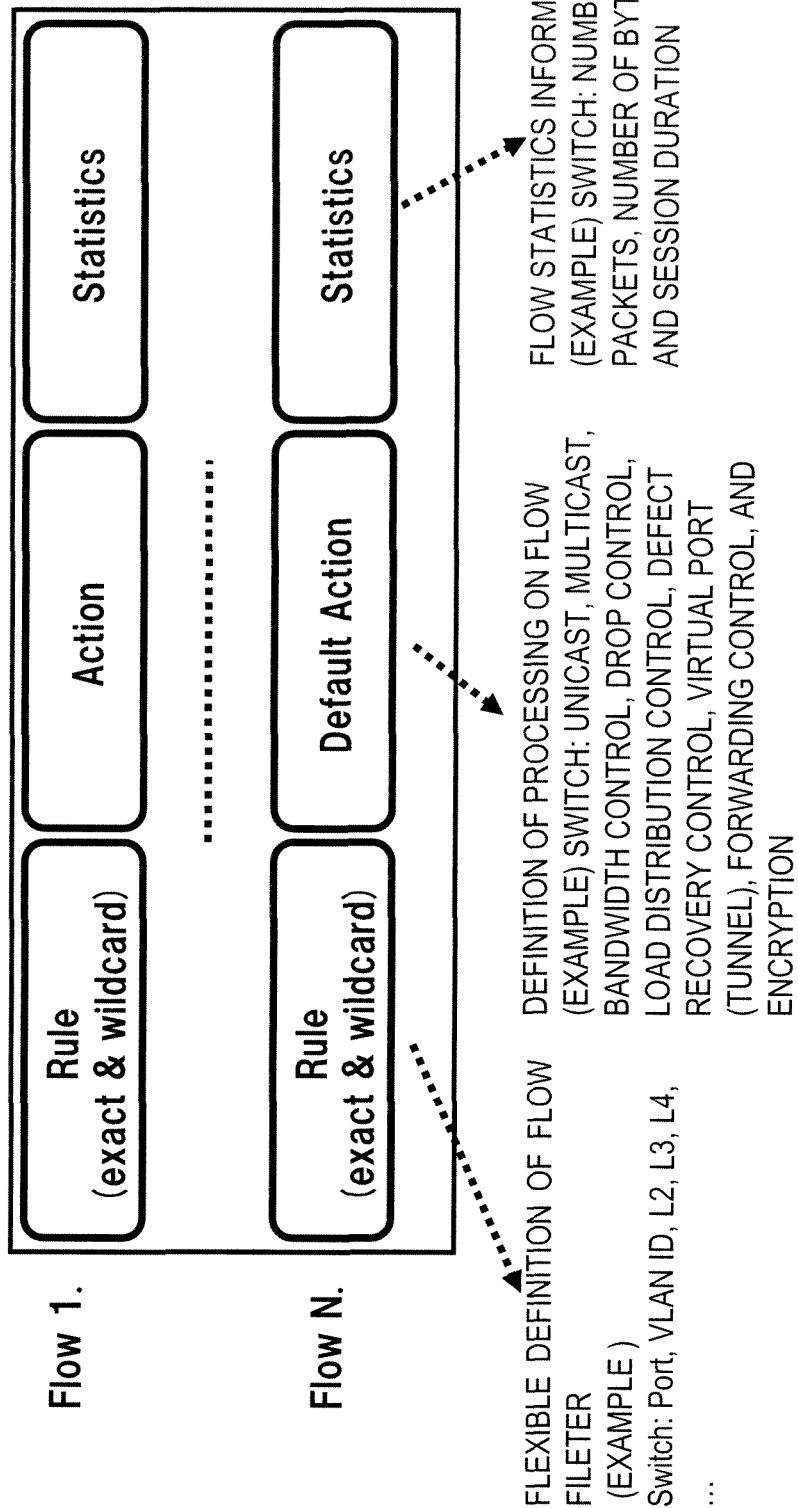
FIG. 19 is a diagram illustrating flow entities in an OFS.

FIG. 18 is a flowchart illustrating a procedure for registering an aggregated flow entity in a switch. FIG. 18 corresponds to step S11 in FIG. 8.

The path aggregation execution unit 207 of the controller 20 creates a new aggregated flow entity in which a wildcard is specified in each of non-matching fields of the rules of a flow entity to be registered (such as the flow entity Fe in FIG. 17A) and an aggregatable flow entity (such as the flow entity 7, 8, or 9 in FIG. 17B). The path aggregation execution unit 207 stores the new aggregated flow entity in the corresponding entry of the switch-specific aggregated flow entities to be managed by the aggregation management table in the aggregated path storage unit 208, and notifies creation of the new aggregated flow entity to the switch state changing unit 206. Upon receipt of notification from the path aggregation execution unit 207, the switch state changing unit 206 instructs the flow entity setting unit 202 to set the newly created aggregated flow entity in the switch 10. The flow entity setting unit 104 of the switch 10 registers the flow entity (aggregated flow entity) notified from the flow entity setting unit 202 of the controller 20 in the flow entity table 102 (in step S11-1).

When the new aggregated flow entity has been registered in the switch 10 and then when the switch state changing unit 206 receives completion of the registration from the switch 10, the switch state changing unit 206 notifies the flow entity setting unit 202 to delete from the flow entity table 102 of the switch 10 the original aggregatable flow entities (such as the flow entities 7, 8, and 9 in FIG. 17B) aggregated into the aggregated flow entity. Upon receipt of instruction to delete the flow entities from the flow entity setting unit 202 of the controller 20, the flow entity setting unit 104 of the switch 10 deletes the corresponding flow entities from the flow entity table 102, and notifies completion of the deletion to the flow entity setting unit 202 of the controller 20 (in step S11-2).

Each flow entity registered in the flow entity table 102 of the switch 10 becomes invalid unless a packet matching with the rule arrives during a period defined by the system, for example. In this case, the path configuration information on the path management table of the valid path storage unit 203 (refer to FIG. 5) and the related entry in the path management table are deleted.

Data structures of the path management table, the path configuration information, the aggregated path management table, and the switch-based aggregated flow entity table described in the above-mentioned exemplary embodiments just show examples of implementation. The present invention, is not, of course, limited to the data structures described above. The nodes in the present invention include the switches (OFSs) in the examples, and also include an arbitrary switch (L2/L3 switch), a router, and the like in which flow control is performed by the controller.

The controller 20 in the above-mentioned exemplary embodiments can also be implemented as a dedicated server. The switch 10 can be implemented not only by the OFS (Open Flow Switch), but also by a node such as an IP network router, or an MPLS (Multi-Protocol Label Switching) switch in an MPLS network. The present invention can be applied to a network in which nodes in the network are centrally controlled by a controller.

Each disclosure of the above-mentioned Patent Documents and Non-patent Documents is incorporated herein by reference. Modifications and adjustments of the exemplary embodiments and an example are possible within the scope of the overall disclosure (including claims) of the present invention, and based on the basic technical concept of the invention. Various combinations or selections of various disclosed elements are possible within the scope of the claims of the present invention. That is, the present invention of course includes various variations and modifications that could be made by those skilled in the art according to the overall disclosure including the claims and the technical concept.

The invention claimed is:

1. A network control method using a controller that controls flows of a plurality of nodes, the method comprising:

in shifting a flow that passes through a specific node onto an alternative path which does not pass through the specific node passed through by the flow, the controller finding a plurality of alternative candidate paths, each which has a same source and a same destination as a path associated with the flow to be shifted, and does not pass through the specific node passed through by the flow to be shifted;

the controller determining the alternative path from the plurality of alternative candidate paths according to a predetermined criterion;

the controller aggregating a plurality of flows of a node on the alternative path, the flow passing through the specific node being shifted thereto, the node, on reception of a packet, matching a header of the packet with a rule of a flow entity in the node to perform an operation based on an action of the flow entity that defines an operation for the received packet matching with the rule, the flow entity in the node being set by the controller, wherein the controller holds in an aggregated path storage unit an aggregated path management table comprising at least an entry, associated with a node with flows thereof aggregated, the entry including:

a node identifier to identify the node; and a pointer to an aggregated flow entity table, the aggregated flow entity table including:

an aggregated flow entity including a rule and an action for the aggregated flow; and a list of pointers to respective flow entities that are aggregated, the controller, in performing flow aggregation, updating the aggregated flow entity table pointed by the pointer associated with the node with flows thereof aggregated, in the aggregated path management table; and the controller updating with the aggregated flow entity the flow entity in the node.

2. A network system comprising:

a controller; and a plurality of nodes for which flow control is performed by the controller, a node among the plurality of nodes including a flow entity, the flow entity including:

a rule to be matched against a header of a packet received by the node and an action that defines an operation for the received packet matching with the rule, the flow entity being set by the controller, wherein in shifting a flow that passes through a specific node onto a different alternative path which does not pass through the specific node passed through by the flow, the controller finds a plurality of alternative candidate paths, each of which has a same source and a same destination, as a path associated with the flow to be shifted and does not pass through the specific node passed through by the flow to be shifted, the controller determines the alternative path from the plurality of alternative candidate paths according to a predetermined criterion, and the controller aggregates a plurality of flows of a node on the alternative path, the flow passing through the specific node being shifted thereto, wherein the controller includes:

an aggregated path storage unit that holds an aggregated path management table comprising at least an entry, associated with a node with flows thereof aggregated, the entry including:

a node identifier to identify the node; and a pointer to an aggregated flow entity table, the aggregated flow entity table including:

an aggregated flow entity including a rule and an action corresponding to the aggregated flow; and a list of pointers to respective flow entities that are aggregated, the controller, in performing flow aggregation, updating the aggregated flow entity table pointed by the pointer associated with the node with flows thereof aggregated, in the aggregated path management table and updating with the aggregated flow entity the flow entity in the node.

3. The network system according to claim 2, wherein the controller configures the flow entity that defines an operation at the node on the flow in each node on the path associated with the flow, the node holds a number of flow entities corresponding to a number of flows that pass through the node and respectively configured by the controller, and in aggregating flows of the node on the alternative path, the controller aggregates flow entities associated with the flows in each node on the alternative path to create an aggregated flow entity and to set the aggregated flow entity in the aggregated flow entity table corresponding to the node with flows thereof aggregated.

4. The network system according to claim 3, wherein the controller determines the alternative path from the plurality of alternative candidate paths, based on a number of entries of flow information in a node on each of the alternative candidate paths.

5. The network system according to claim 4, wherein the controller calculates a sum of numbers of entries of flow information in the respective nodes on each of the alternative candidate paths, and the controller determines one of the alternative candidate paths having the sum of numbers of entries of flow information smaller than any other alternative candidate path, as the alternative path.

6. The network system according to claim 4, wherein the controller finds a maximum value of numbers of entries of flow information in the respective nodes on each of the alternative candidate flows, and the controller determines one of the alternative candidate paths having the maximum value of numbers of entries of flow information smaller than any other alternative candidate path, as the alternative path.

7. The network system according to claim 2, wherein the controller determines the alternative path based on an amount of traffic on each node on each of the alternative candidate paths.

8. The network system according to claim 7, wherein the controller calculates a sum of traffic amounts on the respective nodes on each of the alternative candidate paths; and the controller determines one of the alternative candidate paths having the sum of traffic amounts smaller than any other alternative candidate path, as the alternative path.

9. The network system according to claim 7, wherein the controller finds a maximum value of traffic amounts on the respective nodes on each of the alternative candidate paths, and the controller determines one of the alternative candidate paths having the maximum value of traffic amounts smaller than any other alternative candidate path, as the alternative path.

10. The network system according to claim 2, wherein the flow entity includes at least the action that defines an operation on the packet that matches with the rule including forwarding of the packet from the node, and with respect to the rule and the action of the flow entity in the node passed through by the flow, the controller derives a number of matches in the rule for each of the nodes on each of the alternative candidate paths having an action matched with the action of the flow entity, and the controller sets the flow entity having a highest value of the number of matches to be aggregated.

11. The network system according to claim 10, wherein upon finding that there are a plurality of the flow entities having the same highest value of the number of matches, the controller classifies the flow entities into a plurality of groups according to a combination of the matches with elements in the rule of the flow entity in the node passed through by the flow, and sets the flow entities in one of the plurality of groups having a largest number of the flow entities to be aggregated, and the controller determines the alternative path, based on a sum of numbers of the flow entities in the respective nodes on each of the alternative candidate paths to be aggregated.

12. The network system according to claim 2, wherein the controller creates, from the flow entities in each node on the alternative path that are able to be aggregated, an entry of new flow entity where a field of an element not matching with the rule is specified by a wildcard, and sets and registers the new flow entity in the node, and the node deletes from the node the flow entities that may be aggregated.

13. The network system according to claim 2, wherein in case a number of pointers stored in the list of pointers to the flow entities in the aggregated flow entity table held in the aggregated path storage unit is two or more, the flow entities pointed respectively by the list of pointers are the original flow entities which are aggregated into the aggregated flow entity, in case the number of pointers in the list of pointers to the flow entities is one, the aggregated flow entity is a flow entity that is not aggregated, and in case the number of pointers in the list of pointers to the flow entities is zero, the aggregated flow entity associated with the list of pointers to the flow entities is not actually referenced and is therefore deleted from the aggregated flow entity table.

14. The network system according to claim 2, wherein in shifting the flow that passes through the node onto the alternative path, the controller aggregates a plurality of flows that pass through the node associated with the flow to be shifted and then shifts the aggregated flows onto the alternative path.

15. A controller comprising:

a node state changing unit that controls a change in a state of each node under control;

a flow information configuration unit that configures, in each node on a path associated with a flow, flow information defining an operation on the flow at the node, a flow entity provided in the node including: a rule to be matched by the node against a header of a packet received by the node and an action that defines an operation by the node for the received packet matching with the rule, the flow entity being set by the flow information configuration unit;

an alternative path calculation unit that in shifting a flow that passes through a specific node onto a different alternative path which does not pass through the specific node passed through by the flow, finds a plurality of alternative candidate paths, each of which has a same source and a same destination as a path associated with the flow to be shifted and does not pass through the specific node passed through by the flow to be shifted, and that determines the alternative path from the alternative candidate paths according to a predetermined criterion;

a path aggregation execution unit that aggregates flows of a node on the alternative path, the flow passing through the specific node being shifted thereto; and an aggregated path storage unit that holds an aggregated path management table comprising at least an entry, associated with a node with flows thereof aggregated, the entry including:

a node identifier to identify the node; and a pointer to an aggregated flow entity table, the aggregated flow entity table including:

an aggregated flow entity including a rule and an action corresponding to the aggregated flow; and a list of pointers to respective flow entities that are aggregated, the path aggregation execution unit, in performing flow aggregation, updating the aggregated flow entity table pointed by the pointer associated with the node with flows thereof aggregated, in the aggregated path management table, and the flow information configuration unit updating, with the aggregated flow entity, the flow entity in the node.

16. The controller according to claim 15, wherein a number of flow entities corresponding to a number of flows that pass through the node is set in the node, in aggregating the flow of each node on the alternative path, the path aggregation execution unit aggregates flow entities associated with the flows of each node on the alternative path.

17. The controller according to claim 16, wherein the path aggregation calculation unit determines the alternative path from among the alternative candidate paths, based on a number of flow entities in each node on each of the alternative candidate paths.

18. The controller according to claim 16, comprising:

a traffic management unit that obtains and manages an amount of traffic on the node, wherein the alternative path calculation unit determines the alternative path based on an amount of traffic on each node on each of the alternative candidate paths.

19. The controller according to claim 15, wherein with respect to the rule and the action of the flow entity in the node passed through by the flow, the alternative path calculation unit derives a number of matches in the rule of the flow entity for each of the nodes on each of the alternative candidate paths having an action matched with the action of one flow entity to be aggregated, and sets the flow entity having a highest value of the number of matches to be aggregated with the one flow.

* * * * *